United States Patent
Shi

(10) Patent No.: US 9,772,684 B2
(45) Date of Patent: Sep. 26, 2017

(54) ELECTRONIC SYSTEM WITH WEARABLE INTERFACE MECHANISM AND METHOD OF OPERATION THEREOF

(71) Applicant: Samsung Electronics Co., Ltd., Suwon-si, Gyeonggi-Do (KR)

(72) Inventor: Meng Shi, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 8 days.

(21) Appl. No.: 14/748,032

(22) Filed: Jun. 23, 2015

(65) Prior Publication Data

US 2016/0077581 A1 Mar. 17, 2016

Related U.S. Application Data

(60) Provisional application No. 62/051,776, filed on Sep. 17, 2014.

(51) Int. Cl.
| | |
|---|---|
| G08B 13/08 | (2006.01) |
| G06F 3/033 | (2013.01) |
| A61B 5/103 | (2006.01) |
| G01B 17/00 | (2006.01) |
| G06F 3/01 | (2006.01) |
| G06F 1/16 | (2006.01) |
| G06F 3/0346 | (2013.01) |

(52) U.S. Cl.
CPC ............ G06F 3/011 (2013.01); G06F 1/163 (2013.01); G06F 3/0346 (2013.01)

(58) Field of Classification Search
CPC ......... G08B 13/08; G06F 3/011; G06F 3/033; A61B 5/103; G01B 17/00
USPC ................ 340/546, 407.1, 545.5, 669, 12.5; 341/20, 35; 345/156, 169, 173, 684; 715/863, 864
See application file for complete search history.

(56) References Cited

U.S. PATENT DOCUMENTS

| | | | | |
|---|---|---|---|---|
| 5,515,858 | A | * | 5/1996 | Myllymaki ........ A61B 5/02055 600/301 |
| 5,818,359 | A | * | 10/1998 | Beach ..................... G06F 3/011 340/4.11 |
| 5,924,999 | A | * | 7/1999 | Agee .................... A61B 5/4523 600/587 |
| 5,980,472 | A | * | 11/1999 | Seyl .................... A61B 5/1121 600/587 |

(Continued)

OTHER PUBLICATIONS

T.Starner, J.Auxier, D.Ashbrook, and M.Gandy; "The Gesture Pendant: A Self-illuminating, Wearable, Infrared Computer Vision System for Home Automation Control and Medical Monitoring", http://www.cc.gatech.edu/~thad/p/031_30_Gesture/gesture_pendantISWC2000.pdf, 4th International Symposium of Wearable Computers, 2000.

*Primary Examiner* — Nam V Nguyen

(74) *Attorney, Agent, or Firm* — IP Investment Law Group

(57) ABSTRACT

An electronic system includes: a fastening portion of a joint-wearable device, the fastening portion configured to physically secure the joint-wearable device for affixing the joint-wearable device relative to a physiological joint of a user; and a joint sensor of the joint-wearable device, the joint sensor connected to the fastening portion and configured to generate a sensor output for representing a joint movement associated with the physiological joint in controlling the electronic system according to the joint movement.

10 Claims, 7 Drawing Sheets

(56) References Cited

U.S. PATENT DOCUMENTS

| | | | | |
|---|---|---|---|---|
| 7,676,440 | B2* | 3/2010 | Gorelik | B25J 9/1602 706/15 |
| 8,289,162 | B2 | 10/2012 | Mooring et al. | |
| 8,292,833 | B2* | 10/2012 | Son | A61B 5/1126 250/316.1 |
| 8,303,523 | B2* | 11/2012 | Kudoh | A61H 3/008 601/34 |
| 8,766,162 | B2 | 7/2014 | Tanase | |
| 8,994,827 | B2* | 3/2015 | Mistry | H04N 5/2252 348/158 |
| 9,363,640 | B2* | 6/2016 | Lee | H04W 4/025 |
| 2002/0024500 | A1* | 2/2002 | Howard | G06F 3/014 345/158 |
| 2007/0162404 | A1* | 7/2007 | Gorelik | B25J 9/1602 706/2 |
| 2010/0029327 | A1* | 2/2010 | Jee | G04G 17/045 455/556.1 |
| 2010/0066664 | A1* | 3/2010 | Son | G06F 1/163 345/156 |
| 2010/0124949 | A1* | 5/2010 | Demuynck | G06F 1/1626 455/569.1 |
| 2012/0253167 | A1* | 10/2012 | Bonyak | A61B 5/6885 600/409 |
| 2014/0163435 | A1* | 6/2014 | Yamamoto | A61H 3/00 601/35 |
| 2014/0296761 | A1* | 10/2014 | Yamamoto | A61H 1/0244 602/23 |
| 2016/0299570 | A1* | 10/2016 | Davydov | G06F 1/163 |

\* cited by examiner

ELECTRONIC SYSTEM WITH WEARABLE INTERFACE MECHANISM AND METHOD OF OPERATION THEREOF

CROSS-REFERENCE TO RELATED APPLICATION(S)

This application claims the benefit of U.S. Provisional Patent Application Ser. No. 62/051,776 filed Sep. 17, 2014 and the subject matter is incorporated herein by references thereto.

TECHNICAL FIELD

An embodiment of the present invention relates generally to an electronic system, and more particularly to a system with a wearable interface mechanism.

BACKGROUND

Modern consumer and industrial electronics, especially devices such as computing systems, cellular phones, wearable device, such as health monitors or smart watches, and combination devices are providing increasing levels of functionality to support modern life including online social networks. Research and development in the existing technologies can take numerous different directions.

As users become more empowered with the growth in computing, various uses begin to take advantage of this new device space. There are many technological solutions to take advantage of this new device capability to provide increasing functionalities to the user. However, users often must rely on multiple portable devices to meet the growing needs of modern lifestyles.

Thus, a need still remains for a computing system with wearable interface mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art

SUMMARY

An embodiment provides an electronic system, including: a fastening portion of a joint-wearable device, the fastening portion configured to physically secure the joint-wearable device for affixing the joint-wearable device relative to a physiological joint of a user; and a joint sensor of the joint-wearable device, the joint sensor connected to the fastening portion and configured to generate a sensor output for representing a joint movement associated with the physiological joint in controlling the electronic system according to the joint movement.

An embodiment provides an electronic system, including: a communication interface (316) configured to receive a sensor output for representing a joint movement of a physiological joint of a user detected by a joint sensor; and a control unit, coupled to the communication interface, configured to generate an action command based on the sensor output for controlling the electronic system according to the joint movement.

An embodiment provides a method of operation of an electronic system including: determining a sensor output for representing a joint movement of a physiological joint of a user detected by a joint sensor; and generating with a control unit an action command based on the sensor output for controlling the electronic system according to the joint movement of the user.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
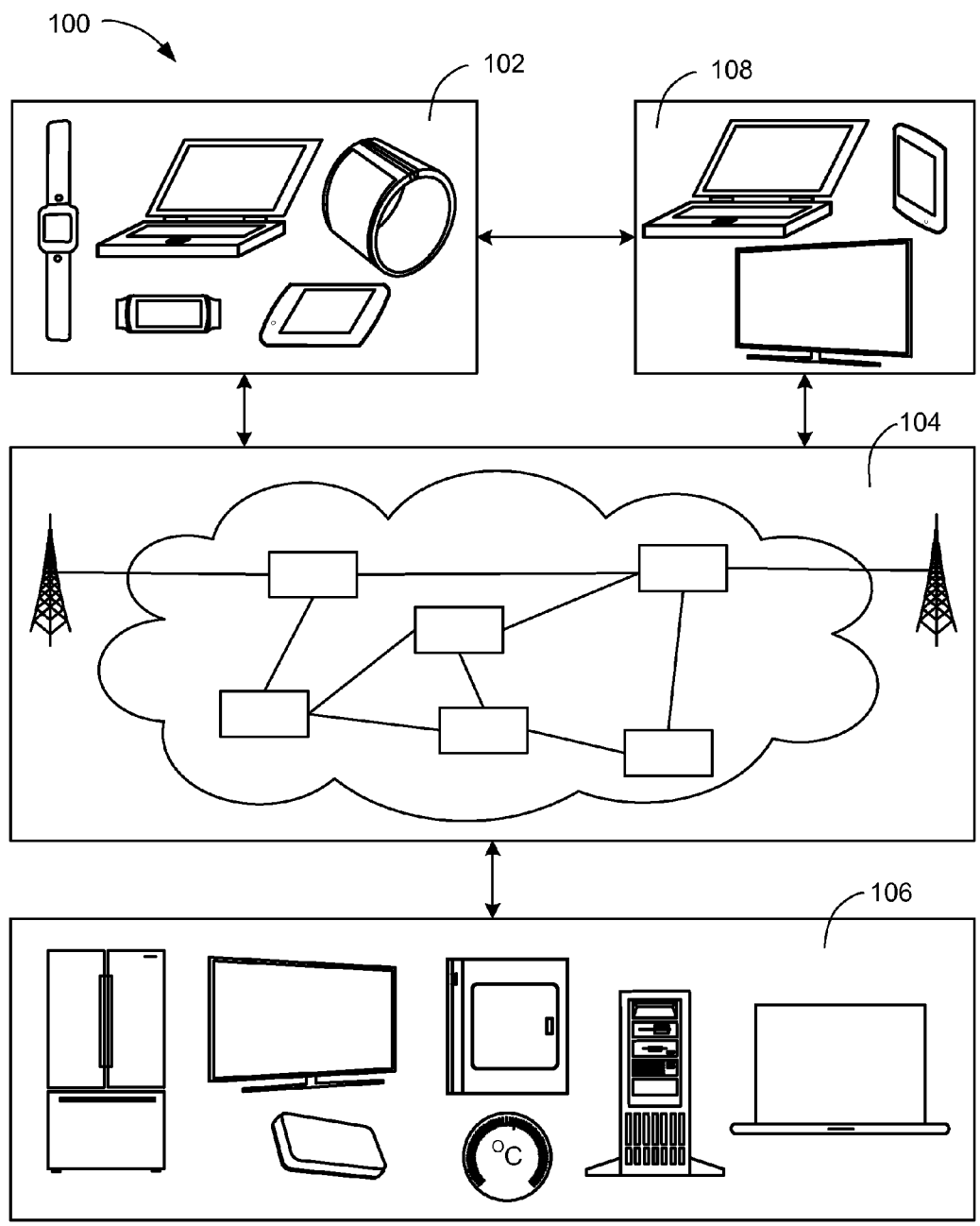
FIG. 1 is an electronic system with a wearable interface mechanism in an embodiment of the present invention.

The following embodiments of the present invention provide a joint-wearable device using one or more joint sensors to determine joint movement of a user. The joint movement can be used to generate action command for controlling a device or a feature. The joint-wearable device can use sensor output from the joint sensors excluding images, thereby utilizing simpler and cheaper means to translate the joint movement to the action command.

An embodiment of the present invention can also generate an operational mode of the client device including a gesture mode, a monitor mode, a game mode, or a combination thereof based on the physical configuration of the client device, the device proximity of the client device to the target device. The client device can also communicate an input signal to the target device for interacting with the target device.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with a transformable mode mechanism in an embodiment of the present invention. The electronic system 100 includes a first device 102, such as a client device, connected to a second device 106, such as a client device or server. The first device 102 can communicate with the second device 106 with a network 104, such as a wireless or wired network.

For example, the first device 102 can be any of a variety of wearable devices, such as a watch, a health monitor, a fitness band, an electronic bracelet, a head-mounted device, a remote device, an electronic accessory, a smart phone, a smart watch, smart glasses, an interface device, or a combination thereof. The first device 102 can be a standalone device or can be incorporated with a mobile device, an entertainment device, an article of clothing, an accessory, an adhesive or a securing mechanism, a multi-functional device, or a combination thereof. The first device 102 can couple to the network 104 to communicate with the second device 106.

The second device 106 can be a mobile device or a non-mobile device. For example, the second device 10 can be any of a variety of mobile devices, such as a smartphone, a tablet device, a cellular phone, a personal digital assistant, a notebook computer, a netbook computer, a thin client device, a multi-functional mobile communication or entertainment device, or a combination thereof.

The second device 106 can also be a non-mobile device such as a computing device, an appliance, an internet of things (IoT) device, or a combination thereof. The second device 106 can be any of a variety of centralized or decentralized computing devices. For example, the second device 106 can be a desktop computer, a grid computing resource, a server, a server farm, a virtualized computing resource, a cloud computing resource, a router, a switch, a peer-to-peer distributed computing resource, or a combination thereof.

The second device 106 can be centralized in a single computer room, distributed across different rooms, distributed across different geographical locations, or embedded within a telecommunications network. For example, the second device 106 can be a particularized machine, such as a mainframe, a server, a cluster server, a rack mounted server, or a blade server, or as more specific examples, an IBM System z10™ Business Class mainframe or a HP ProLiant ML™ server.

The second device 106 can also be an appliance including a living room appliance, a kitchen appliance, a bathroom appliance, a bedroom appliance, or a combination thereof. For example, the second device 10 can include a television, a video device, an audio device, a clock, a lighting unit, a home entertainment system, a washing machine, a refrigerator, an oven, a microwave, a gaming console, or a combination thereof. In addition, the second device 106 can include a thermostat, an alarm system, a heating unit, a cooling unit, an electronic door lock, a garage door opener, a power generation system, or a combination thereof.

The electronic system 100 can further include a third device 108. The third device 108, such as a client or a server, can be connected to the first device 102, the second device 106, or a combination thereof. The third device 108 can be similar to the first device 102, the second device 106, or a combination thereof.

For example, the third device 108 can include any variety of consumer devices, wearable devices, servers, appliances, stationary or mobile devices, centralized or decentralized devices, IoT devices, or a combination thereof. The third device 108 can couple, either directly or indirectly, to the network 104 to communicate with another device, couple directly to another device, or can be a stand-alone device. The third device 108 further be separate from or incorporated with a vehicle, such as a car, truck, bus, or train.

For illustrative purposes, the electronic system 100 is described with the first device 102 as a wearable device, although it is understood that the first device 102 can be a different type of device, such as a mobile device, a stationary device, or a combination thereof. Also for illustrative purposes, the electronic system 100 is described with the second device 106 as a server or a device at a service provider, although it is understood that the second device 106 can be a different type of device, such as a consumer device or a mobile device. Also for illustrative purposes, the electronic system 100 is described with the third device 108 as a smart phone or an appliance, although it is understood that the third device 108 can be a different type of device, such as a server, a desktop, a building-management system.

Also for illustrative purposes, the electronic system 100 is shown with the second device 106, the first device 102, and the third device 108 as end points of the network 104, although it is understood that the electronic system 100 can have a different partition between the first device 102, the second device 106, the third device 108, and the network 104.

For example, the first device 102, the second device 106, the third device 108, or a combination thereof can also function as part of the network 104. As a more specific example, the first device 102 can be a watch-type device and the second device 106 can be a server. In this example, the first device 102 can connect directly to the second device 106 through the network 104. As an additional example, the first device 102 representing the watch-type device can connect to the server through another instance of the second device 106 such as a smartphone, a notebook, a desktop computer, or a combination thereof.

The network 104 can be a variety of networks or communication mediums. For example, the network 104 can include wireless communication, wired communication, optical communication, ultrasonic communication, or a combination thereof. Satellite communication, cellular communication, Bluetooth™, Bluetooth™ Low Energy (BLE), wireless High-Definition Multimedia Interface (HDMI), ZigBee™, Near Field Communication (NFC), Infrared Data Association standard (IrDA), wireless fidelity (WiFi), and worldwide interoperability for microwave access (WiMAX) are examples of wireless communication that can be included in the network 104. Ethernet, HDMI, digital subscriber line (DSL), fiber to the home (FTTH), and plain old telephone service (POTS) are examples of wired communication that can be included in the network 104.

Further, the network 104 can traverse a number of network topologies and distances. For example, the network 104 can include a direct connection, personal area network (PAN), local area network (LAN), metropolitan area network (MAN), wide area network (WAN) or any combination thereof.

Figure 2:
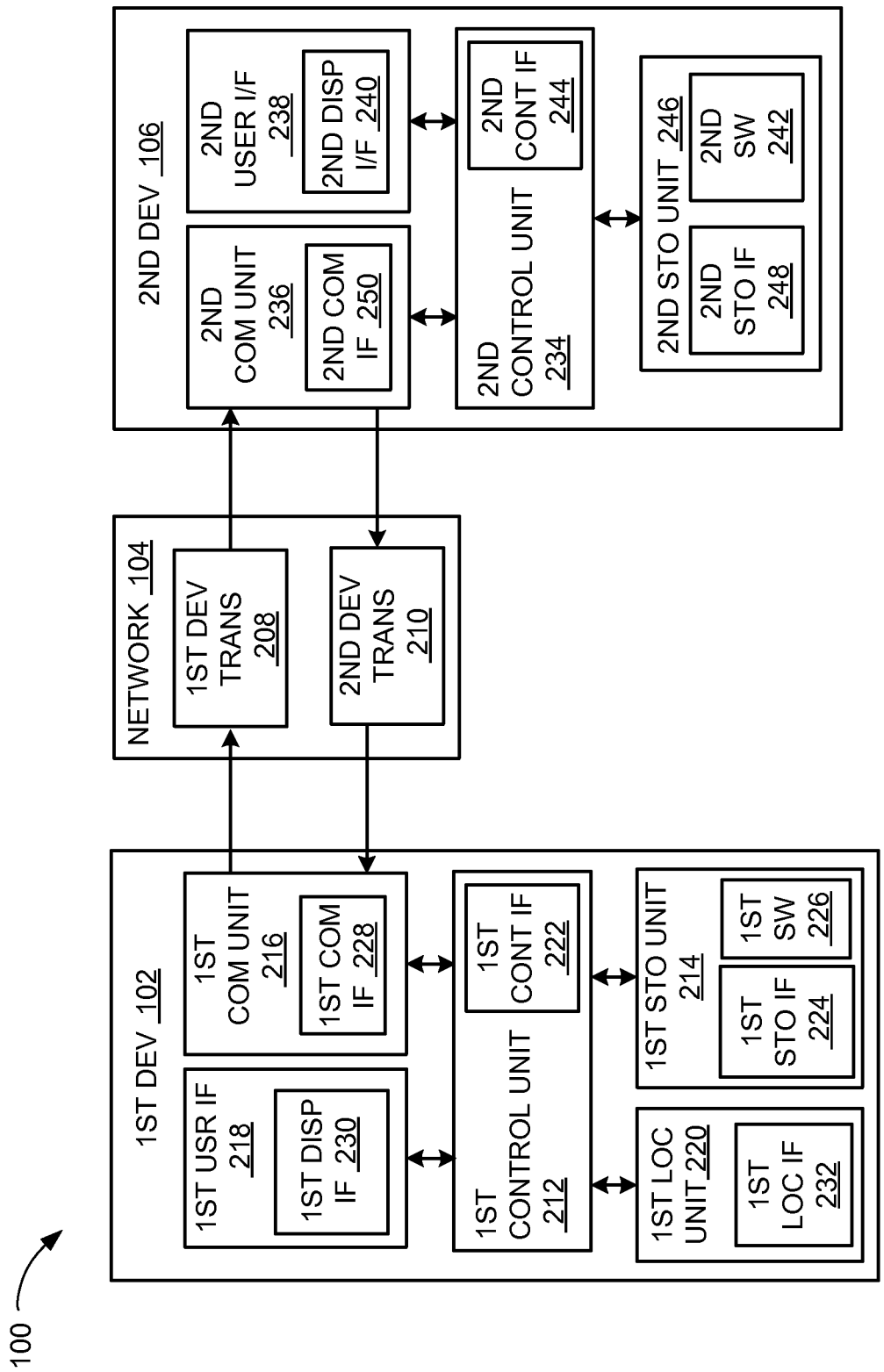
FIG. 2 is an exemplary block diagram of the electronic system.

Referring now to FIG. 2 therein is shown an exemplary block diagram of the electronic system 100. The electronic system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the electronic system 100 is shown with the first device 102 as a client device, although it is understood that the electronic system 100 can have the first device 102 as a different type of device. For example, the first device 102 can be a relay device.

Also for illustrative purposes, the electronic system 100 is shown with the second device 106 as a mobile device, a computing device, an appliance, or a combination thereof, although it is understood that the electronic system 100 can have the second device 106 as a different type of device.

For brevity of description in this embodiment of the present invention, the first device 102 will be described as a client device and the second device 106 will be described as a mobile device, a computing device, an appliance, a wearable device, or a combination thereof. Embodiments of the present invention are not limited to this selection for the type of devices. The selection is an example of the embodiments of the present invention.

The first device 102 can include a first control unit 212, a first storage unit 214, a first communication unit 216, a first user interface 218, a location unit 220, or a combination thereof. The first control unit 212 can include a first control interface 222. The first control unit 212 can execute a first software 226 to provide the intelligence of the electronic system 100. The first control unit 212 can be implemented in a number of different manners.

For example, the first control unit 212 can be a processor, an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The location unit 220 can generate a location information, a heading, an acceleration, and a speed of the first device 102, as examples. The location unit 220 can be implemented in many ways. For example, the location unit 220 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The location unit 220 can include a location interface 232. The location interface 232 can be used for communication between the location unit 220 and other functional units in the first device 102. The location interface 232 can also be used for communication that is external to the first device 102.

The location interface 232 can receive information from the other functional units or from external sources, or can transmit information to the other functional units or to external destinations. The external sources and the external destinations refer to sources and destinations external to the first device 102.

The location interface 232 can include different implementations depending on which functional units or external units are being interfaced with the location unit 220. The location interface 232 can be implemented with technologies and techniques similar to the implementation of the first control interface 222.

The first storage unit 214 can store the first software 226. The first storage unit 214 can also store relevant information, such as advertisements, biometric information, points of interest (POIs), navigation routing entries, reviews/ratings, feedback, or any combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the location unit 220 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a notebook computer, and the network 104.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a sensor, a signal generator, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100, including receiving location information from the location unit 220. The first control unit 212 can further execute the first software 226 for interaction with the network 104 via the first communication unit 216.

The second device 106 can be optimized for implementing the various embodiments in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows the user to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the network 104.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the relevant information, such as advertisements, biometric information, points of interest, navigation routing entries, reviews/ratings, feedback, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the location unit 220 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or an antenna, for interaction with the network 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The electronic system 100 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 3 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 220, although it is understood that the second device 106 can also operate the location unit 220.

Figure 3:
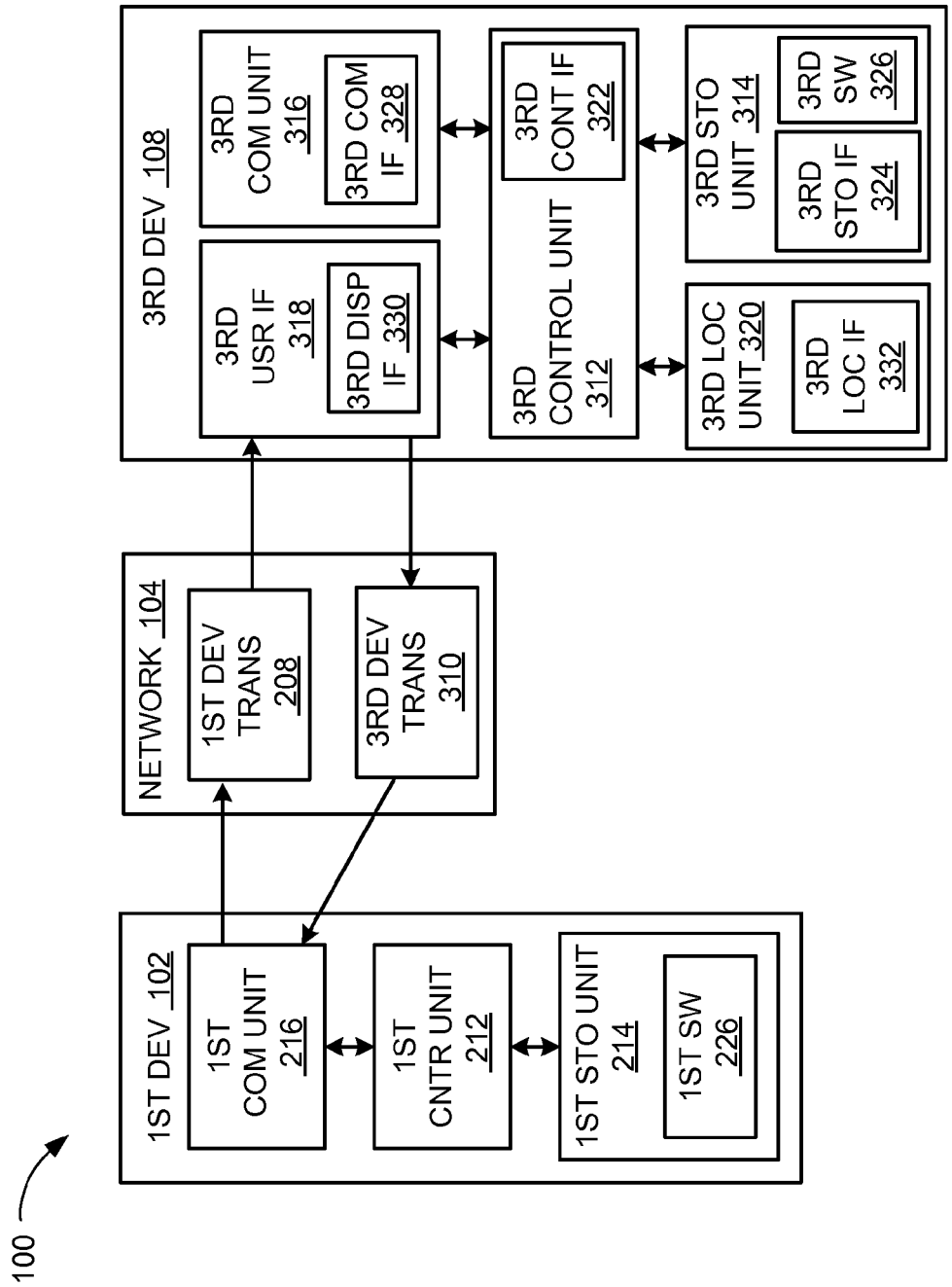
FIG. 3 is a further exemplary block diagram of the electronic system.

Referring now to FIG. 3, therein is shown a further exemplary block diagram of the electronic system 100. Along with the first device 102 and the second device 106 of FIG. 2, the electronic system 100 can include the third device 108. The first device 102 can send information in the first device transmission 208 over the network 104 to the third device 108. The third device 108 can send information in a third device transmission 310 over the network 104 to the first device 102, the second device 106, or a combination thereof.

For illustrative purposes, the electronic system 100 is shown with the third device 108 as a client device, although it is understood that the electronic system 100 can have the third device 108 as a different type of device. For example, the third device 108 can be a server.

Also for illustrative purposes, the electronic system 100 is shown with the first device 102 communicating with the third device 108. However, it is understood that the second device 106, or a combination thereof can also communicate with the third device 108 in a similar manner as the communication between the first device 102 and the second device 106.

For brevity of description in this embodiment of the present invention, the third device 108 will be described as a client device. The embodiment of the present invention is not limited to this selection for the type of devices. The selection is an example of an embodiment of the present invention.

The third device 108 can be optimized for implementing an embodiment of the present invention in a multiple device or multiple user embodiments with the first device 102. The third device 108 can provide the additional or specific functions compared to the first device 102, the second device 106, or a combination thereof. The third device 108 can further be a device owned or used by a separate user different from the user of the first device 102.

The third device 108 can include a third control unit 312, a third storage unit 314, a third communication unit 316, a third user interface 318, a third location unit 320, or a combination thereof. The third control unit 312 can include a third control interface 322. The third control unit 312 can execute a third software 326 to provide the intelligence of the electronic system 100.

The third control unit 312 can be implemented in a number of different manners. For example, the third control unit 312 can be a processor, an application specific integrated circuit (ASIC) an embedded processor, a microprocessor, a hardware control logic, a hardware finite state machine (FSM), a digital signal processor (DSP), or a combination thereof. The third control interface 322 can be used for communication between the third control unit 312 and other functional units in the third device 108. The third control interface 322 can also be used for communication that is external to the third device 108.

The third control interface 322 can receive information from the other functional units or from external sources, or can transmit information to the other functional units or to external destinations. The external sources and the external destinations refer to sources and destinations external to the third device 108.

The third control interface 322 can be implemented in different ways and can include different implementations depending on which functional units or external units are being interfaced with the third control interface 322. For example, the third control interface 322 can be implemented with a pressure sensor, an inertial sensor, a microelectromechanical system (MEMS), optical circuitry, waveguides, wireless circuitry, wireline circuitry, or a combination thereof.

The third storage unit 314 can store the third software 326. The third storage unit 314 can also store the relevant information, such as data representing incoming images, data representing previously presented image, sound files, or a combination thereof.

The third storage unit 314 can be a volatile memory, a nonvolatile memory, an internal memory, an external memory, or a combination thereof. For example, the third storage unit 314 can be a nonvolatile storage such as non-volatile random access memory (NVRAM), Flash memory, disk storage, or a volatile storage such as static random access memory (SRAM). Also for example, the third storage unit 314 can be distribution of storage elements, multiple hierarchy storage system including different levels of caching, main memory, rotating media, or off-line storage, or a combination thereof.

The third storage unit 314 can include a third storage interface 324. The third storage interface 324 can be used for communication between the third storage unit 314 and other functional units in the third device 108. The third storage interface 324 can also be used for communication that is external to the third device 108.

The third storage interface 324 can receive information from the other functional units or from external sources, or can transmit information to the other functional units or to external destinations. The external sources and the external destinations refer to sources and destinations external to the third device 108.

The third storage interface 324 can include different implementations depending on which functional units or external units are being interfaced with the third storage unit 314. The third storage interface 324 can be implemented with technologies and techniques similar to the implementation of the third control interface 322.

The third communication unit 316 can enable external communication to and from the third device 108. For example, the third communication unit 316 can permit the third device 108 to communicate with the second device 106, the first device 102, a different device, an attachment, such as a peripheral device or a desktop computer, the network 104, or a combination thereof.

The third communication unit 316 can also function as a communication hub allowing the third device 108 to function as part of the network 104 and not limited to be an end point or terminal unit to the network 104. The third communication unit 316 can include active and passive components, such as microelectronics or an antenna, for interaction with the network 104.

The third communication unit 316 can include a baseband device or component, a modem, a digital signal processor, or a combination thereof for transmitting, formatting, receiving, detecting, decoding, further processing, or a combination thereof for communication signals. The third communication unit 316 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 316 can further include one or more portions for storing information, such as cache or RAM memory, registers, or a combination thereof.

The third communication unit 316 can include a third communication interface 328. The third communication interface 328 can be used for communication between the third communication unit 316 and other functional units in the third device 108. The third communication interface 328 can receive information from the other functional units or can transmit information to the other functional units.

The third communication interface 328 can include different implementations depending on which functional units are being interfaced with the third communication unit 316. The third communication interface 328 can be implemented with technologies and techniques similar to the implementation of the third control interface 322.

The third user interface 318 allows a user (not shown) to interface and interact with the third device 108. The third user interface 318 can include an input device and an output device. Examples of the input device of the third user interface 318 can include a keypad, a touchpad, soft-keys, a keyboard, a microphone, an infrared sensor for receiving remote signals, or any combination thereof to provide data and communication inputs.

The third user interface 318 can include a third display interface 330. The third display interface 330 can include an output device. The third display interface 330 can include a display, a projector, a video screen, a speaker, or any combination thereof.

The third control unit 312 can operate the third user interface 318 to display information generated by the electronic system 100. The third control unit 312 can also execute the third software 326 for the other functions of the electronic system 100, including receiving location information from the third location unit 320. The third control unit 312 can further execute the third software 326 for interaction with the network 104 via the third communication unit 316.

The third location unit 320 can generate location information, current heading, current acceleration, and current speed of the third device 108, as examples. The third location unit 320 can be implemented in many ways. For example, the third location unit 320 can function as at least a part of the global positioning system, an inertial computing system, a cellular-tower location system, a pressure location system, or any combination thereof. Also, for example, the third location unit 320 can utilize components such as an accelerometer or GPS receiver.

The third location unit 320 can include a third location interface 332. The third location interface 332 can be used for communication between the third location unit 320 and other functional units in the third device 108. The third location interface 332 can also be used for communication external to the third device 108.

The third location interface 332 can receive information from the other functional units or from external sources, or can transmit information to the other functional units or to external destinations. The external sources and the external destinations refer to sources and destinations external to the third device 108.

The third location interface 332 can include different implementations depending on which functional units or external units are being interfaced with the third location unit 320. The third location interface 332 can be implemented with technologies and techniques similar to the implementation of the third control unit 312.

For illustrative purposes, the third device 108 is shown with the partition having the third user interface 318, the third storage unit 314, the third control unit 312, and the third communication unit 316, although it is understood that the third device 108 can have a different partition. For example, the third software 326 can be partitioned differently such that some or all of its function can be in the third control unit 312 and the third communication unit 316. Also, the third device 108 can include other functional units not shown in FIG. 3 for clarity.

The functional units in the third device 108 can work individually and independently of the other functional units. The third device 108 can work individually and independently from the first device 102, the second device 106, and the network 104.

For illustrative purposes, the electronic system 100 is described by operation of the first device 102 and the third device 108. It is understood that the first device 102, the second device 106, and the third device 108 can operate any of the modules and functions of the electronic system 100.

Figure 4:
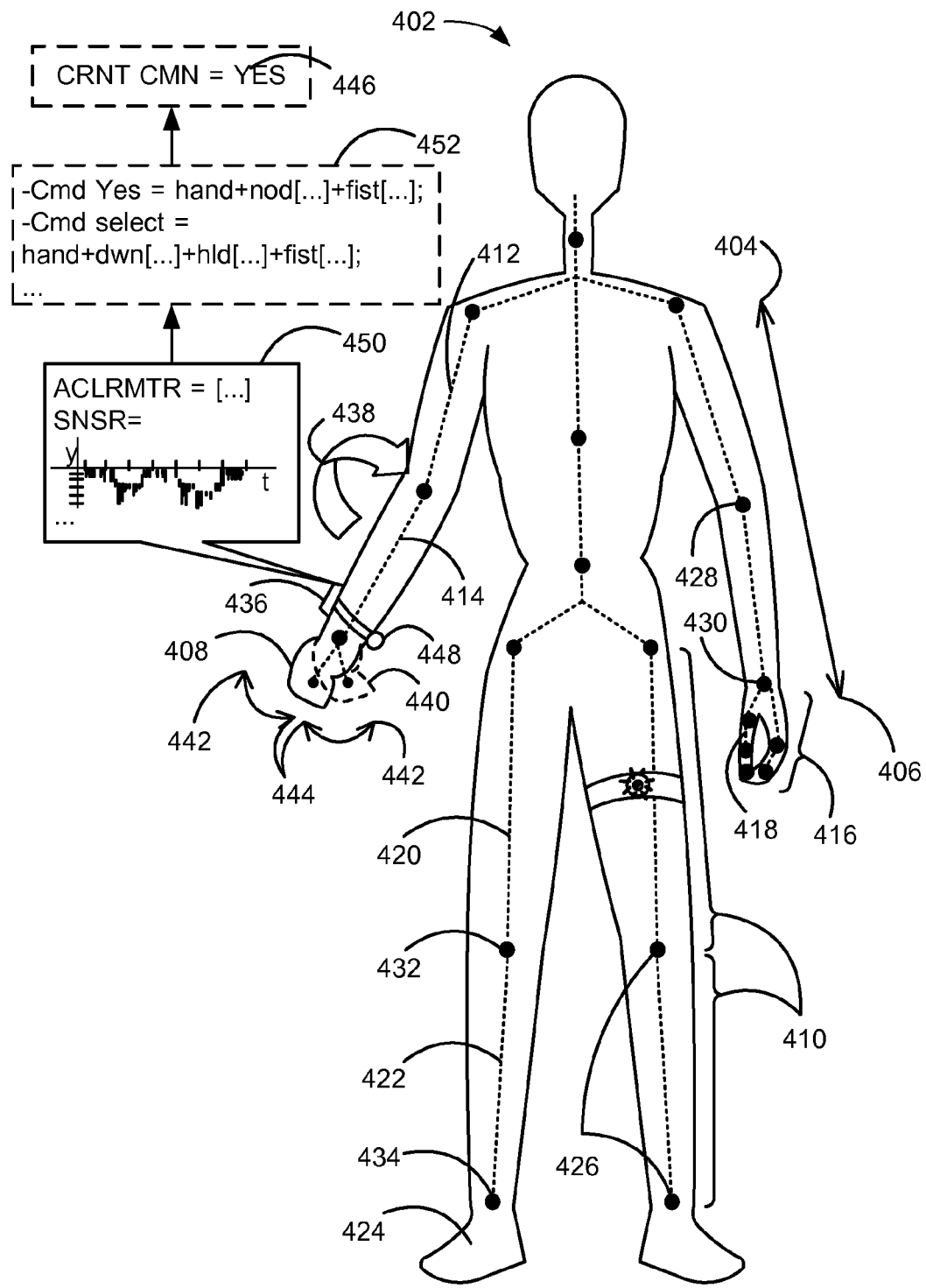
FIG. 4 is an exemplary configuration of the electronic system of FIG. 1.

Referring now to FIG. 4, therein is shown an exemplary configuration the electronic system 100 of FIG. 1. FIG. 4 can depict the electronic system 100 relative to a user 402. The user 402 can be a person utilizing, owning, carrying, wearing, or a combination thereof for the first device 102 of FIG. 1, the third device 108 of FIG. 1, or a combination thereof. The user 402 can also be a person interfacing with the electronic system 100.

The electronic system 100 can operate relative to physiology or the body of the user 402. The electronic system 100 can distinguish between a distal portion 404, a proximal portion 406, a reference side 408, or a combination thereof for a physiological segment 410 of the user 402.

The physiological segment 410 can include a body part of the user 402 or a representation thereof. The physiological segment 410 can include or represent a limb or an extremity of the user 402. For example, the physiological segment 410 can include or represent an arm or a leg. As a more specific example, the physiological segment 410 can include or represent an upper arm 412, a forearm 414, a hand 416, a finger 418, a thigh 420, a lower leg 422, a foot 424, or a combination thereof.

The physiological segment 410 can include the distal portion 404 and the proximal portion 406. The distal portion 404 can be a portion or an area of the physiological segment 410 or a representation thereof situated away from a point of origin or center. The distal portion 404 can be a portion further away from body or torso of the user 402 along a connection of body parts of the user 402.

The proximal portion 406 can be a portion or an area of the physiological segment 410 or a representation thereof situated toward or near a point of origin or center. The proximal portion 406 can be a portion closer to the body or torso of the user 402. The proximal portion 406 can be opposite the distal portion 404.

The hand 416 is attached to the distal portion 404 of the forearm 414. The upper arm 412 is attached to the proximal portion 406 of the forearm 414. The forearm 414 is attached to the distal portion 404 of the upper arm 412.

The reference side 408 can be an arbitrary distinction for a surface or a region of the physiological segment 410. The reference side 408 can include on a portion or a surface of the physiological segment 410 facing away from or towards the torso or the center at a resting position. The reference side 408 can be a commonly-known distinction. For example, the reference side 408 can include a top surface or sole of the foot 424, back or top side of the hand 416 or palm, front side of the torso or the back, front or back of the leg, or a combination thereof.

The physiological segments 410 are connected at or to form a physiological joint 426. The physiological joint 426 can include an elbow 428, a wrist 430, a knee 432, an ankle 434, or a combination thereof.

The electronic system 100 can include a joint-wearable device 436. The joint-wearable device 436 is a device or a portion of a device worn on the person of the user 402 at, on, over, or near the physiological joint 426. The first device 102 or a portion therein can include the joint-wearable device 436.

For example, the joint-wearable device 436 can include a watch, a bracelet, a health monitor, a device embedded in or integral with a distal end of a long-sleeve, or a combination thereof worn on or about the wrist 430. Also for example, the joint-wearable device 436 can include a necklace, a charm, a device embedded in or integral with a neckline or a collar, or a combination thereof worn on or about the neck of the user 402. Also for example, the joint-wearable device 436 can include an elbow sleeve, a device embedded in or integral with a distal end of a short sleeve or middle portion of a long sleeve, or a combination thereof worn on or about the elbow 428 of the user 402.

The joint-wearable device 436 can include the first user interface 218 of FIG. 2, the first communication unit 216 of FIG. 2, the first control unit 212 of FIG. 2, the first location unit 232 of FIG. 2, the first storage unit 214 of FIG. 2, or a combination thereof. For example, the joint-wearable device 436 can be a smart watch including a processor, a touch screen, a memory, or a combination thereof or another type of stand-alone device.

Also for example, the joint-wearable device 436 can be the first user interface 218, the first communication unit 216, a portion therein, or a combination thereof in a casing separate from another device or unit, such as a smart phone. The joint-wearable device 436 can be an input-output device for the smart phone or a processing portion without the capability to process or perform complex processes. The joint-wearable device 436 can interact with the user 402, such as be receiving inputs and providing outputs and communicate the interaction information to the coupled device. The coupled device can process the information.

The joint-wearable device 436 can detect, identify, determine, or a combination thereof for an overall movement 438, a joint movement 440, or a combination thereof. The overall movement 438 can include a movement or a displacement of the physiological segment 410 away on the proximal portion 406 relative to the joint-wearable device 436, or a representation of the movement or the displacement. The overall movement 438 can include the movement, the displacement, the representation thereof, or a combination thereof for entirety of the joint-wearable device 436.

The joint movement 440 can include a movement, a change in orientation, a representation thereof, or a combination thereof for the physiological segment 410 connected to or forming the physiological joint 426 on or near the joint-wearable device 436. The joint movement 440 can include a flexion movement 442 for bending a limb and an extension movement 444 for straightening a limb, opposite of the flexion movement 442.

For example, the joint-wearable device 436 of a watch or a bracelet worn on or about the wrist 430 can detect, identify, determine, or a combination thereof for the overall movement 438 caused by displacement or movement of the upper arm 412 or the forearm 414. The flexion movement 442 or the extension movement 444 about the elbow 428 can cause the overall movement 438 for the watch or the bracelet. The watch or the bracelet can further detect, identify, determine, or a combination thereof for the joint movement 440 about the wrist 430, such as movement or change in orientation of the hand 416 relative to the wrist 430.

The electronic system 100 can process the overall movement 438, the joint movement 440, or a combination thereof from the joint-wearable device 436 as an action command 446. The action command 446 is an input from the user 402 given through movement or change in orientation of the person of the user 402 for controlling a device, a feature, a function, or a combination thereof.

The action command 446 can correspond to a specific movement, a specific timing, or a combination thereof for the physiological segment 410, the physiological joint 426, or a combination thereof for the user 402. The electronic system 100 can use the joint-wearable device 436 to detect, identify, determine, recognize, generate, or a combination thereof for the action command 446. The action command 446 can control the first device 102, the second device 106 of FIG. 1, the third device 108 of FIG. 1, a portion therein, or a combination thereof.

The electronic system 100 can generate, recognize, or a combination thereof for the action command 446 using a joint sensor 448. The joint-wearable device 436 can include the joint sensor 448.

The joint sensor 448 is a device or a portion therein for detecting changes in an environment associated with the joint-wearable device 436. The joint sensor 448 can detect changes in the physical environment surrounding the joint-wearable device 436. The joint sensor 448 can detect environmental changes associated with or caused by the joint movement 440.

For example, the joint sensor 448 can detect environmental changes associated with or caused by changes in shape or alignment of the physiological joint 426 associated with or caused by the joint movement 440. Also for example, the joint sensor 448 can detect environmental changes associated with or caused by changes in relative location between multiple instances of the physiological segment 410 across one or more instances of the physiological joint 426 associated with or caused by the joint movement 440.

The joint-wearable device 436 can generate a sensor output 450. The joint-wearable device 436 can generate the sensor output 450 in generating the action command 446.

The sensor output 450 is the data from the joint-wearable device 436 corresponding to movement of the user 402. The sensor output 450 can be from a sensor associated with the physiological segment 410, the physiological joint 426, or a combination thereof for the user 402. For example, the sensor output 450 can be data from a GPS receiver, an accelerometer, a gyroscope, a compass, a light sensor, a sound sensor, a contact-based sensor, a force or pressure sensor, or a combination thereof included in the joint-wearable device 436.

The sensor output 450 can include or exclude captured images. The sensor output 450 can include simple data representing a binary value or a magnitude detected at a certain time or include complex data, such as an image captured at a certain time.

The electronic system 100 can further generate, recognize, or a combination thereof for the action command 446 based on a command pattern profile 452. The command pattern profile 452 is a description of a relationship between the sensor output 450 and the action command 446.

The command pattern profile 452 can include a template, a pattern, a threshold, a range, a timing, or a combination thereof corresponding to the sensor output 450 for defining, recognizing, generating, or a combination thereof for the action command 446. The electronic system 100 can recognize or generate the action command 446 by comparing the sensor output 450 with the command pattern profile 452.

The electronic system 100 can recognize or generate the action command 446 when the sensor output 450 matches a command, an entity, an entry, or a combination thereof in the command pattern profile 452. The electronic system 100 can recognize or generate the action command 446 matching the information from the GPS receiver, an accelerometer, the gyroscope, the compass, the light sensor, the sound sensor, the contact-based sensor, the force or pressure sensor, or a combination thereof included in the joint-wearable device 436 to control a device or a feature of the electronic system 100. Details regarding the processing for the action command 446 are discussed below.

Figure 5:
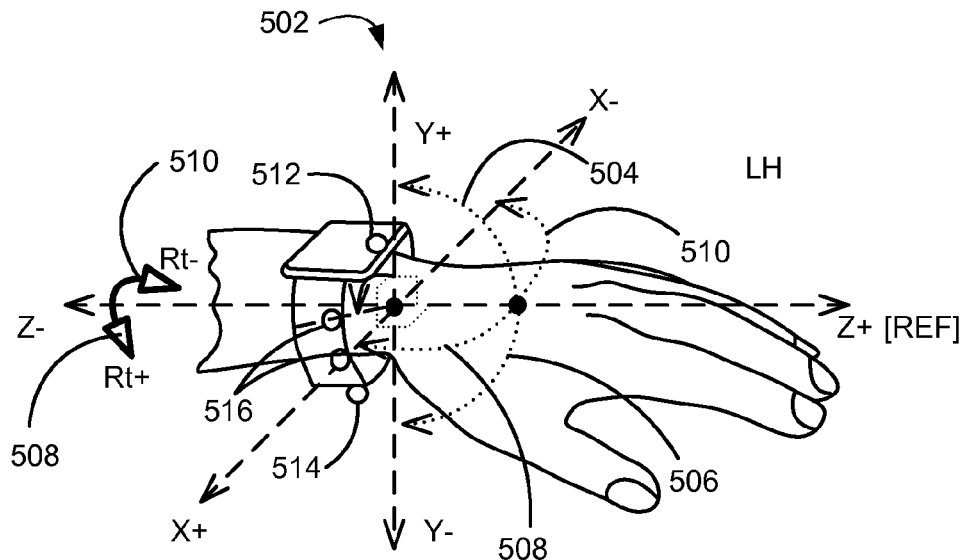
FIG. 5 is an exemplary depiction of a motion reference profile for the electronic system.

Referring now to FIG. 5, therein is shown an exemplary depiction of a motion reference profile 502 for the electronic system 100. The motion reference profile 502 is a set of information for describing directions and orientations for the joint-wearable device 436 of FIG. 4. The motion reference profile 502 can include a grid or a coordinate system. The motion reference profile 502 can further include an origin and direction-define axes.

The motion reference profile 502 can correspond to an instance of the physiological joint 426 of FIG. 4. The motion reference profile 502 can be relative to the physiological segment 410 of FIG. 4, the physiological joint 426 of FIG. 4, the torso or the head of the user 402 of FIG. 4, a direction or orientation external of the user 402, or a combination thereof. The motion reference profile 502 can correspond to and describe the joint movement 440 of FIG. 4.

For example, the motion reference profile 502 can include a positive direction 504, a negative direction 506, a positive-further direction 508, a negative-further direction 510, or a combination thereof. The positive direction 504 and the negative direction 506 can be opposite each other. The positive-further direction 508 and the negative-further direction 510 can be opposite each other. A plane or a line including the positive direction 504 and the negative direction 506 can be orthogonal to a further plane or a further line including the positive-further direction 508 and the negative-further direction 510.

As a more specific example, the positive direction 504 can correspond to the flexion movement 442 of FIG. 4 about the wrist 430 of FIG. 4 with the hand 416 of FIG. 4 decreasing an angle about the wrist 430 between the thumb and the forearm 414 of FIG. 4. The positive-further direction 508 can correspond to the flexion movement 442 about the wrist 430 with the hand 416, decreasing a further angle about the wrist 430 between the reference side 408 of FIG. 4 or back of the hand 416 and the forearm 414.

Also as a more specific example, the positive direction 504 can correspond to the flexion movement 442 of the elbow 428 of FIG. 4. The positive-further direction 508 can correspond to rotation of the hand 416 about an axis of the forearm 414, or twisting of the forearm 414, in a predetermined direction.

The motion reference profile 502 can be arbitrarily defined or set. The motion reference profile 502 can include a system of defining movement known or predefined in a specific field. The motion reference profile 502 can further be predetermined or set by the electronic system 100.

The joint-wearable device 436 can include one or more instances of the joint sensor 448 of FIG. 4 corresponding to the motion reference profile 502. For example, the joint-wearable device 436 can include a first-direction sensor 512, a further-direction sensor 516, a first-opposing sensor 514, or a combination thereof.

The first-direction sensor 512 can include the joint sensor 448 associated with one direction of movement for the physiological joint 426. For example, the first-direction sensor 512 can include the joint sensor 448 associated with the flexion movement 442 of FIG. 4, the extension movement 444 of FIG. 4, or a combination thereof. As a more specific example, the first-direction sensor 512 can be associated with or detecting the joint movement 440 along the positive direction 504, the negative direction 506, or a combination thereof.

The further-direction sensor 516 can include the joint sensor 448 associated with a direction of movement different from directions associated with the first-direction sensor 512. The further-direction sensor 516 can include the joint sensor 448 associated with a direction orthogonal to or offset from the directions associated with the first-direction sensor 512.

The further-direction sensor 516 can include the joint sensor 448 associated with the flexion movement 442, the extension movement 444, or a combination thereof in a plane different from the plane including movements associated with the first-direction sensor 512. As a more specific example, the further-direction sensor 516 can be associated with or detecting the joint movement 440 along the positive-further direction 508, the negative-further direction 510, the negative direction 506, or a combination thereof.

The further-direction sensor 516 can further include the first-opposing sensor 514. The first-opposing sensor 514 can include the joint sensor 448 associated with a direction of movement for the physiological joint 426 opposite in comparison to the direction associated with the first-direction sensor 512. The first-opposing sensor 514 and the first-direction sensor 512 can be associated with movement along the same plane but in opposing directions.

The first-opposing sensor 514 can include the joint sensor 448 associated with the flexion movement 442, the extension movement 444, or a combination thereof in a direction opposite to the first-direction sensor 512. As a more specific example, the first-opposing sensor 514 can be associated with or detecting the joint movement 440 along the negative direction 506, the positive direction 504, or a combination thereof.

It has been discovered that the first-direction sensor 512 and the first-opposing sensor 514 for generating the action command 446 of FIG. 4 provides increased accuracy. The two opposing instances of the joint sensor 448 can provide the sensor output 450 of FIG. 4 that complement each other along a plane. The two complementing instances of the sensor output 450 can be used to further cancel and ignore unwanted influences and accurately determine the joint movement 440. The increased accuracy in determining the joint movement 440 can provide the increased accuracy in generating the action command 446 intended by the user 402.

It has further been discovered that the first-direction sensor 512 and the further-direction sensor 516 for generating the action command 446 provides increased number of commands. The first-direction sensor 512 and the further-direction sensor 516 can determine the joint movement 440 along multiple directions. The first-direction sensor 512 and the further-direction sensor 516 can determine the joint movement 440 in three dimensions instead of being limited to a plane. The additional directions and ability to determine movement in three dimensions can allow detection of complex instances of the joint movement 440. The increase in complexity can increase the number of commands available to the user 402 using gestures.

Figure 6:
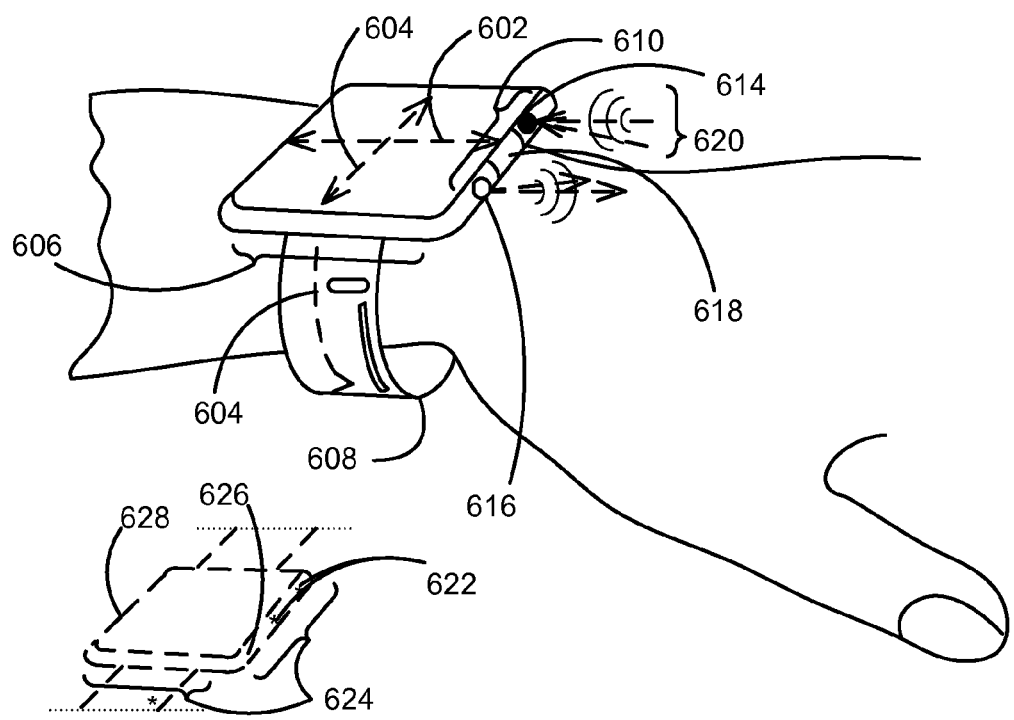
FIG. 6 is an exemplary depiction of the joint-wearable device of FIG. 4.

Referring now to FIG. 6, therein is shown an exemplary depiction of the joint-wearable device 436 of FIG. 4. The joint-wearable device 436 can include a device-reference profile. The device-reference profile can include directions and orientations to serve as reference in describing a shape or location of the joint-wearable device 436 and the portions therein. The device-reference profile can include a part-length direction 602, a part-orthogonal direction 604, or a combination thereof.

The part-length direction 602 is a direction extending parallel or coincident with the physiological segment 410 of FIG. 4. The part-length direction 602 can be parallel to or coincident with a direction toward or away from the body or torso of the user 402 of FIG. 4 along connection of body parts or along a limb. The part-length direction 602 can be parallel to or coincident with a direction or a line extending between abutting instance of the physiological segment 410 at the end of the extension movement 444 for the physiological joint 426 of FIG. 4 corresponding to the joint-wearable device 436.

The part-orthogonal direction 604 is a direction orthogonal to the part-length direction 602. The part-orthogonal direction 604 can go around a circumference of the physiological segment 410 along the surface of the physiological segment 410.

The joint-wearable device 436 can include a central portion 606, a fastening portion 608, or a combination thereof. The central portion 606 is a section of the joint-wearable device 436 located at a center portion or including an objective or functionality of the joint-wearable device 436. The central portion 606 can include the time-piece portion of a watch, a pendant of a necklace, or a showcase portion of an earring.

The fastening portion 608 is a section of the joint-wearable device 436 configured to attach, affix, or secure the joint-wearable device 436 relative to one or more instances of the physiological segment 410 of the user 402. The fastening portion 608 of the joint-wearable device 436 can be configured to physically secure the joint-wearable device 436 and affix the joint-wearable device 436 relative to the physiological joint 426 of the user 402.

The fastening portion 608 can utilize friction, force, pressure, or a combination thereof to attach, affix, or secure the joint-wearable device 436 relative to one or more instances of the physiological segment 410, the physiological joint 426, or a combination thereof. The fastening portion 608 can include a shape, a material with specific characteristic, a mechanism, or a combination thereof for utilizing the friction, the force, the pressure, or a combination thereof to attach, affix, or secure the joint-wearable device 436.

For example, the fastening portion 608 can include a strap, a band, a clasp, a latch, a tie, a ring, a clamping mechanism, or a combination thereof. As a more specific example, the fastening portion 608 can include a watch strap, a bracelet clasp, a flexible band, a ring band, a hook, a chain, or a combination thereof.

The fastening portion 608 can be constructed of a variety of materials. For example, the fastening portion 608 can be constructed of a polymeric material, an elastomeric material, a metallic material, a fabric, or a combination thereof.

The fastening portion 608 can be coupled to the central portion 606. The fastening portion 608 can affix, attach, or secure the central portion 606 relative to one or more instances of the physiological segment 410 of the user 402.

The joint-wearable device 436 can further include one or more instances of the joint sensor 448 of FIG. 4. The fastening portion 608 can affix, attach, or secure the central portion 606 relative to one or more instances of the physiological segment 410 of the user 402.

The joint sensor 448 can be directly attached to, directly connected to, or embedded in the central portion 606, the fastening portion 608, or a combination thereof. For example, the joint sensor 448 directly attached to or directly connected to the fastening portion 608 can be located on the fastening portion 608 and be connected to the central portion 606 through the fastening portion 608. The fastening portion 608 can affix, attach, or secure the joint sensor 448 relative to one or more instances of the physiological segment 410, the physiological joint 426, or a combination thereof of the user 402.

The joint sensor 448 can detect environmental changes associated with or caused by the joint movement 440 of FIG. 4. The joint sensor 448 can generate the sensor output 450 of FIG. 4 for representing the joint movement 440 associated with or of the physiological joint 426. The joint sensor 448 can generate the sensor output 450, which can be processed to generate the action command 446 of FIG. 4 for controlling a device, a feature, a function, or a combination thereof for the electronic system 100.

For example, the joint sensor 448 can detect environmental changes including changes in incoming light, detect contact between the joint sensor 448 and one or more instances of the physiological segment 410 of the user 402, detect changes in shape or forces applied to the joint sensor 448, or a combination thereof. As a more specific example, the joint sensor 448 can include a force sensor 612, an energy sensor 614, a signal generator 616, a contact sensor 618, or a combination thereof for detecting the environmental changes.

The force sensor 612 is a device or a portion therein configured to detect a distortion in a shape of or a physical or contact force applied to the joint-wearable device 436 or a portion therein. For example, the force sensor 612 can detect physical force or a push applied to a specific location, in a specific direction, a magnitude of the force, or a combination thereof. Also for example, the force sensor 612 can include a flexion sensor to detect a bend, a stretch, a compression in a physical structure of or in the flexion sensor.

The energy sensor 614 is a device or a portion therein configured to detect changes in incoming energy or vibration. The energy sensor 614 can detect changes in intensity, frequency or color, or a combination thereof for energy or vibrations coming into the sensor. For example, the energy sensor 614 can include an electromagnetic energy sensor or an ambient light sensor, a microphone or a sound sensor, an infrared or heat sensor, or a combination thereof.

The energy sensor 614 can detect energy reflecting from or emitted by one or more instances of the physiological segment 410, such as light reflected off the skin or heat generated by a body part of the user 402. The energy sensor 614 can further detect absence or decrease in incoming energy due to a body part of the user 402 block a line of sight (LOS) of the sensor, absence of a body part of the user 402 user in the LOS, a change in orientation of the sensor caused by a movement of the user 402, or a combination thereof.

The signal generator 616 is a device or a portion therein configured to emit energy. For example, the signal generator 616 can emit light, sound, or a combination thereof. The signal generator 616 can emit energy perceivable or unperceivable to a human being including the user 402. The signal generator 616 can emit the energy for detection by the joint sensor 448.

The signal generator 616 can complement the joint sensor 448 including the energy sensor 614. The signal generator 616 can emit the energy to be detected by the energy sensor 614. The joint sensor 448 including the energy sensor 614 can generate the sensor output 450 based on detecting the energy from the signal generator 616 in relation to the physiological joint 426, the first physiological segment 410, the second physiological segment 410, or a combination thereof.

For example, the signal generator 616 can emit the energy, such as an electromagnetic energy or an acoustic energy. The emitted energy can reflect off of one or more instances of the physiological segment 410 of the user 402 based on the joint movement 440, or based on an orientation or status of the physiological joint 426. The energy sensor 614 can detect the emitted energy that has been reflected off of the one or more instances of the physiological segment 410.

The contact sensor 618 is a device or a portion therein configured to detect a physical contact with the skin of the user 402. For example, the contact sensor 618 can include capacitive sensor using a plurality of capacitive cells and conductor plates, a resistive sensor, a piezoelectric sensor including a piezo-resistive sensor or a piezo-capacitive sensor, an acoustic sensor including a surface acoustic wave sensor, an array of transducers or actuators, a pressure sensor, an array of infrared sensors, a MEMS sensor, a mechanical switch or a push button, or a combination thereof.

The joint sensor 448 can include an image capturing device. The joint sensor 448 can also include less complex devices excluding the image capturing device. The electronic system 100 can use the simpler and less complex devices, as exemplified above, to determine the joint movement 440 and generate the action command 446 without utilizing image analysis and recognition. The electronic system 100 can use the simpler and less complex instances of the sensor output 450 including a binary value or a magnitude corresponding to time for determining the joint movement 440 and generating the action command 446.

The joint sensor 448 can include a sensing direction 620. The sensing direction 620 can include a direction of detection for the joint sensor 448. The sensing direction 620 can be based on the sensing unit, an orientation or a location thereof, or a combination thereof. For example, the sensing direction 620 can include a direction or an orientation of a sensing surface or unit, the LOS, a mechanical arrangement associated with detectable direction, a characteristic of the joint sensor 448, or a combination thereof.

As a more specific example, the sensing direction 620 can be associated with a bending direction or a compression or stretching direction detectable by the force sensor 612 based on the characteristic and alignment of the sensing unit. The sensing direction 620 for detecting the bend can be along the part-length direction 602. The sensing direction 620 for detecting stretch or compression can be along the part-orthogonal direction 604.

Also as a more specific example, the sensing direction 620 of the energy sensor 614, the emitting direction of the signal generator 616, or a combination thereof can be along the part-length direction 602. The sensing direction 620 can be complementary to the emitting direction. Also as a more specific example, the sensing direction 620 associated with the contact sensor 618 can be along the part-length direction 602.

The joint-wearable device 436 can take many different physical forms or shapes, include different types of sensor location profile 622, include different types of the joint sensor 448, or a combination thereof based on the central portion 606, the fastening portion 608, or a combination thereof. The joint-wearable device 436 can further take many different physical forms or shapes, include different types of sensor location profile 622, include different types of the joint sensor 448, or a combination thereof based on instance of the physiological segment 410 intended or designed for placement of the joint-wearable device 436. The joint-wearable device 436 can further take many different physical forms or shapes, include different types of sensor location profile 622, include different types of the joint sensor 448, or a combination thereof based on instance of the physiological joint 426 intended or designed to be proximate to the joint-wearable device 436.

For example, the joint-wearable device 436 can include or be without one or more instances of the central portion 606, the fastening portion 608, or a combination thereof. Also example, the joint-wearable device 436 can take the form or shape of a jewelry or an accessory. Also for example, the joint-wearable device 436 can be attached to or integrated with clothing.

As a more specific example, the joint-wearable device 436 can include a smart watch, a necklace interface, an earring interface, an arm band, a head band, eye glasses, a glove, or a combination thereof. Also as a more specific example, the joint-wearable device 436 can be attached or be integrated with an end of a sleeve, in the middle of the sleeve, at the end of a cuff or hem, in the middle of a pant leg or a skirt, at an edge or in the middle of a shoe, within a glove, at the end or in the middle of a collar, or a combination thereof.

The joint-wearable device 436 can include one or more instances of the joint sensor 448 according to a sensor location profile 622. The sensor location profile 622 is a description of a placement of the joint sensor 448 for the joint-wearable device 436.

The sensor location profile 622 can describe the location, the orientation, or a combination thereof for one or more instances of the joint sensor 448 for the joint-wearable device 436. The sensor location profile 622 can describe the location, the orientation, or a combination thereof for one or more instances of the joint sensor 448 directly attached to, embedded in, coupled to, or a combination thereof relative to the central portion 606, the fastening portion 608, or a combination thereof.

The sensor location profile 622 can further describe the sensing direction 620. The joint-wearable device 436 can include the sensor location profile 622 relative to one or more instances of the physiological segment 410, the physiological joint 426, or a combination thereof. The joint-wearable device 436 can include the sensor location profile 622 specific to the physiological segment 410, the physiological joint 426, or a combination thereof intended or designed to be associated with the placement of the joint-wearable device 436.

For example, the sensor location profile 622 can describe the location of the joint sensor 448 on the upper arm 412 of FIG. 4, the forearm 414 of FIG. 4, the hand 416 of FIG. 4, the finger 418 of FIG. 4, the thigh 420 of FIG. 4, the lower leg 422 of FIG. 4, or the foot of FIG. 4. Also for example, the sensor location profile 622 can describe the location of the joint sensor 448 adjacent to or within a threshold distance from the elbow 428 of FIG. 4, the wrist 430 of FIG. 4, the knee 432 of FIG. 4, or the ankle 434 of FIG. 4. Also for example, the sensor location profile 622 can describe the sensing direction 620 go over or extend across the physiological joint 426.

As a more specific example, the sensor location profile 622 of a smart watch including the joint sensor 448 can be located at the distal portion 404 of FIG. 4 of the forearm 414, adjacent to or within a threshold distance from the wrist 430, across the wrist 430 opposite the hand 416, or a combination thereof. Also as a more specific example, the sensor location profile 622 of the smart watch can include the sensing direction 620 going over or extending across the wrist 430 toward the hand 416 and the finger 418. Also as a more specific example, the sensor location profile 622 of the smart watch can include the sensing direction 620 going over or extending across the elbow 428 toward the upper arm 412.

Also as a more specific example, the sensor location profile 622 of a necklace interface including the joint sensor 448 can be located below the neck, on the shoulders, or on the chest of the user 402. The sensor location profile 622 of the necklace interface can be located adjacent to or within a threshold distance from the neck. The sensing direction 620 can go over or extend across the neck toward the head of the user 402.

The sensor location profile 622 can describe a location, an orientation, or a combination thereof for the joint sensor 448 based on a physical trait or characteristic of the joint-wearable device 436. For example, the sensor location profile 622 can describe a location of the joint sensor 448 on a bottom surface directly contacting the person of the user 402, a top surface opposite the bottom surface, or a combination thereof for the joint-wearable device 436. Also for example, the sensor location profile 622 can he sensor location profile 622 can further describe the location of the joint sensor 448 relative to a device edge 624, including a distal device-edge 626, a proximal device-edge 628, one or more section-parallel edges, or a combination thereof.

The device edge 624 can be an outside or peripheral limit of the joint-wearable device 436. The device edge 624 can be a surface or a line of the joint-wearable device 436 furthest from a center location thereof along a line or a direction.

The distal device-edge 626 is an instance of the device edge 624 near or toward the distal portion 404 of FIG. 4 of the user 402. The proximal device-edge 628 is an instance of the device edge 624 near or toward the proximal portion 406 of FIG. 4 of the user 402. The distal device-edge 626 and the proximal device-edge 628 can be opposite each other at ends of the joint-wearable device 436 along the part-length direction 602. The distal device-edge 626 and the proximal device-edge 628 can be along a direction parallel or similar to the part-orthogonal direction 604.

The joint sensor 448 can be attached to, near, or integral with, or a combination thereof relative to the device edge 624, such as the distal device-edge 626 or the proximal device-edge 628. The joint sensor 448 can be attached on the device edge 624 corresponding to, near, or facing the physiological joint 426 associated with the joint-wearable device 436.

The joint-wearable device 436 can include one or more instances of the joint sensor 448 located, affixed, arranged, oriented, or a combination thereof according to the sensor location profile 622. For example, the joint-wearable device 436 can include the fastening portion 608 configured to physically secure and affix the joint sensor 448, the central portion 606, or a combination thereof on the reference side 408 of FIG. 4 associated with the physiological joint 426.

As a more specific example, the fastening portion 608 can physically secure and affix the joint sensor 448, the central portion 606, or a combination thereof on top surface of the wrist continuous with back of the hand 416 or on the distal portion 404 of the forearm 414. Also as a more specific example, the fastening portion 608 can physically secure and affix the joint sensor 448, the central portion 606, or a combination thereof on the chest or the neck of the user 402.

Continuing with the example, the fastening portion 608 can secure and affix the joint sensor 448 including the first-direction sensor 512 of FIG. 5 directly on the reference side 408 in association with the positive direction 504 of FIG. 5 for the physiological joint 426. The first-direction sensor 512 can detect the joint movement 440 in the positive direction 504, the negative direction 506 of FIG. 5, or a combination thereof, including the reference side 408 of the hand 416 moving closer to or further away from the forearm 414, the reference side 408 or the face of the head moving toward or away from the chest corresponding to looking down or up, or a combination thereof.

Also for example, the joint-wearable device 436 can include the fastening portion 608 configured to secure or affix multiple instances of the joint sensor 448, the central portion 606, or a combination thereof. The fastening portion 608 can secure or affix the first-opposing sensor 514 of FIG. 5, the further-direction sensor 516 of FIG. 5, or a combination thereof along with the first-direction sensor 512.

As a more specific example, the fastening portion 608 can secure or affix the first-direction sensor 512 on the reference side 408. The fastening portion 608 can further secure or affix the first-opposing sensor 514 opposite the reference side 408, such as directly on a bottom surface of the wrist continuous with palm of the hand 416 or on the back of the neck. The fastening portion 608 can secure or affix the first-opposing sensor 514 for detect the joint movement 440 in the negative direction 506, the positive direction 504, or a combination thereof opposite to the first-direction sensor 512.

Also as a more specific example, the fastening portion 608 can secure or affix the further-direction sensor 516 in association with the positive-further direction 508 of FIG. 5, the negative-further direction 510 of FIG. 5, or a combination thereof forming an angle with the positive direction 504 associated with the first-direction sensor 512 on the reference side 408. The further-direction sensor 516 sensing along a direction forming 180 degrees or opposite the positive direction 504 can include the first-opposing sensor 514 as described above.

Continuing with the specific example, the further-direction sensor 516 can sense the joint movement 440 along the direction or the plane forming the angle excluding 180 degrees relative to the positive direction 504 for the first-direction sensor 512. The further-direction sensor 516 can further sense the joint movement 440 along the direction or the plane orthogonal to the positive direction 504.

The fastening portion 608 can physically secure or affix the joint-wearable device 436 relative to the physiological joint 426 connecting two instances of the physiological segment 410. For example, the fastening portion 608 can physically secure or affix the joint-wearable device 436 with the fastening portion 608, the joint sensor 448, the central portion 606, or a combination thereof directly on the physiological joint 426. The fastening portion 608, the joint sensor 448, the central portion 606, or a combination thereof can directly contact the physiological joint 426 or a portion thereof, overlap the physiological joint 426 or a portion thereof, or a combination thereof.

Also for example, the fastening portion 608 can physically secure or affix the joint-wearable device 436 adjacent to the physiological joint 426. The fastening portion 608 can physically secure or affix the fastening portion 608, the joint sensor 448, the central portion 606, or a combination thereof directly on the physiological segment 410 adjacent to and integral with the physiological joint 426 associated with the joint-wearable device 436. The fastening portion 608 can physically secure or affix the joint sensor 448 oriented with the sensing direction 620 extending across the physiological joint 426 toward a further instance of the physiological segment 410 opposite the physiological joint 426.

The first user interface 218 of FIG. 2 or a portion therein can include the joint sensor 448. The joint sensor 448 can further include a sensing unit, an external interface unit, a communication unit, a control unit, a storage unit, a location unit, one or more internal interfaces, or a combination thereof. The joint sensor 448 can include active or passive circuitry, MEMS, mechanical portions, chemical portions, or a combination thereof for the sensing unit to detect the environmental changes.

The joint sensor 448 can further include software, firmware, embedded circuitry or logic, or a combination thereof for controlling the operation of the joint sensor 448. The joint sensor 448 can further be controlled by or interact with the first user interface 218, other units within the first device 102 of FIG. 1, the second device 106 of FIG. 1, the third device 108 of FIG. 1, or a combination thereof.

The electronic system 100 can detect, identify, determine, or a combination thereof for the joint movement 440 using the joint-wearable device 436. The electronic system 100 can recognize the joint movement 440 based on detection information from the joint sensor 448 of the joint-wearable device 436. The joint sensor 448 can generate the sensor output 450 for generating the action command 446 corresponding to the joint movement 440.

The electronic system 100 can further process the joint movement 440 to recognize the action command 446 intended by the user 402. The electronic system 100 can generate the action command 446 based on the sensor output 450, the joint movement 440, or a combination thereof.

The electronic system 100 can initiate processes or changes in reaction to the action command 446 to implement or follow the action command 446 from the user 402 given through the joint movement 440. The electronic system 100 can implement or follow the action command 446 generated based on the sensor output 450 to control the electronic system 100, a function or a device therein, or a combination thereof.

The electronic system 100 can detect, identify, determine, or a combination thereof for the joint movement 440, generate the action command 446 based on the joint movement 440, implement the action command 446, or a combination thereof using one or multiple devices. For example, the electronic system 100 can use the first device 102 of FIG. 1, the second device 106 of FIG. 1, the third device 108 of FIG. 1, or a combination thereof. Also for example, the electronic system 100 can use the joint-wearable device 436 implemented in one physical enclosure or device or across multiple enclosures or devices. Details regarding the processing for the joint movement 440 and the action command 446 are discussed below.

It has been discovered that the joint-wearable device 436 including the joint sensor 448 provides increased usability. The joint-wearable device 436 including the joint sensor 448 can be used to capture and utilize readily known and accepted human gestures, such as for "yes" or communicating a direction, as inputs for the electronic system 100. The joint-wearable device 436 including the joint sensor 448 can further increase the usability by freeing up one or more user's hand and by freeing up the user's eyes in providing the input signal. The user 402 can simply gesture to provide the input without touching looking at the interface device or portion of the device.

It has further been discovered that the joint sensor 448 located about the user 402 according to the sensor location profile 622 provides increased details regarding the movement and behavior of the user 402. The joint sensor 448 detecting the joint movement 440 from specific positions according to the sensor location profile 622 can watch various movements of the user 402 throughout the day or for a specific purpose, such as in athletics. The increased data of the user's movements at a finer granularity can provide insight into the user's movement previously unavailable without a heavy cost. The increased data can be used to improve performance or efficiency, analyze and prevent injuries, promote physical well-ness, or a combination thereof for the user 402.

It has further been discovered that the joint sensor 448 including the force sensor 612, the energy sensor 614, the contact sensor 618, or a combination thereof provides simpler, cheaper, and quicker solution in processing the action command 446. The joint sensor 448 excluding the imaging device can use simple measurements to determine the joint movement 440 of the user 402. The sensor output 450 from the force sensor 612, the energy sensor 614, the contact sensor 618, or a combination thereof can be processed without analyzing images to recognize body parts, sequence of movements, or a combination thereof. The simpler instances of the sensor output 450 precluding image analysis can reduce processing complexity, which can reduce the cost and the performance speed.

Figure 7:
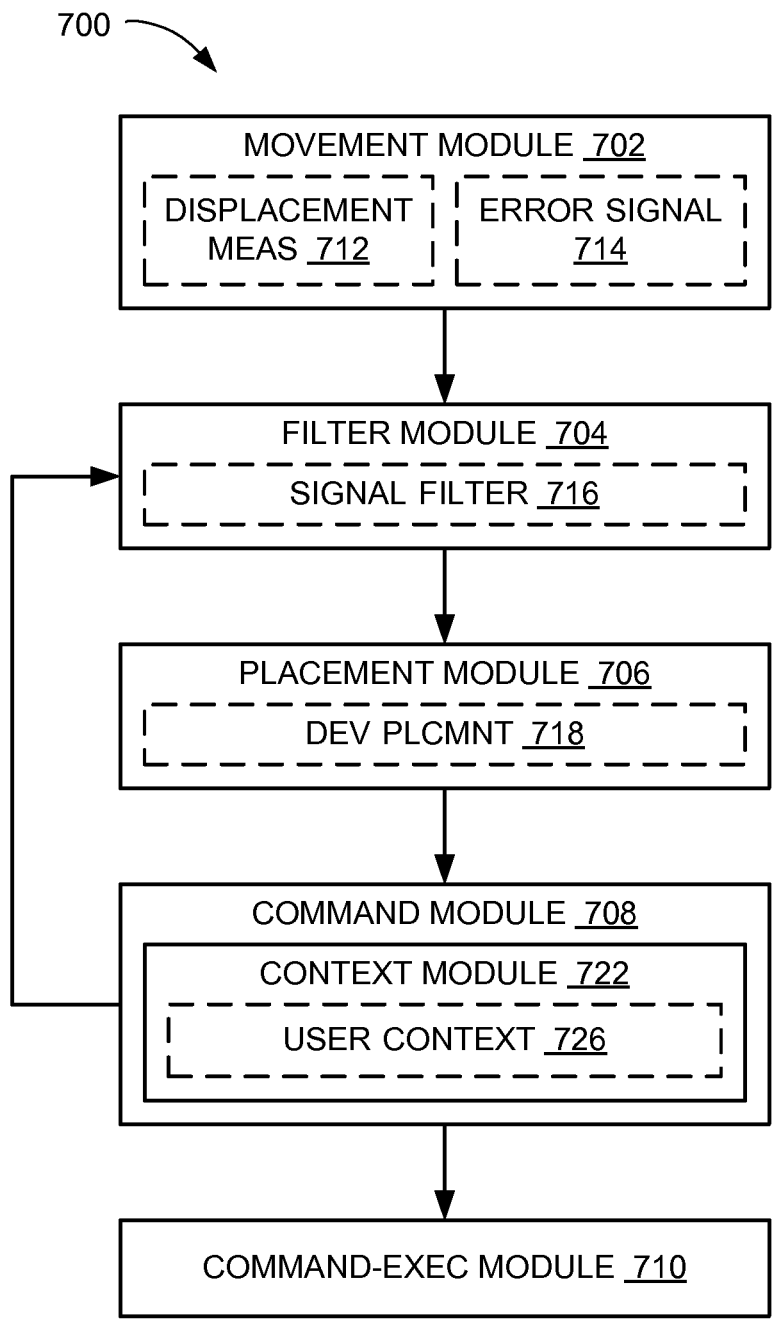
FIG. 7 is a control flow of the electronic system of FIG. 1.

Referring now to FIG. 7, therein is shown a control flow 700 of the electronic system 100 of FIG. 1. The electronic system 100 can include a movement module 702, a filter module 704, a placement module 706, a command module 708, a command-execution module 710, or a combination thereof.

The movement module 702 can be coupled to the filter module 704. The filter module 704 can be further coupled to the placement module 706, the command module 708, or a combination thereof. The placement module 706 can be coupled to the command module 708. The command module 708 can be coupled to the command-execution module 710.

The modules can be coupled using wired or wireless connections, by having an output of one module as an input of the other module, by having operations of one module influence operation of the other module, or a combination thereof. The modules, similar to the different portions of the joint-wearable device 436 of FIG. 4 described above, can be directly coupled with no intervening structure or object other than the connector there-between. The modules can further be indirectly coupled through a structure, an object, or a combination thereof other than the connector there-between.

The movement module 702 is configured to process the sensor output 450 of FIG. 4. The movement module 702 can determine the sensor output 450 based on the joint-wearable device 436, the joint sensor 448 of FIG. 4 therein, or a combination thereof.

The movement module 702 can determine the sensor output 450 based on generating the sensor output 450. The movement module 702 can determine the sensor output 450 for representing the joint movement 440 of FIG. 4 of the physiological joint 426 of FIG. 4 of the user 402 of FIG. 4 detected by the joint sensor 448.

The movement module 702 can use the joint sensor 448 to generate the sensor output 450 corresponding to detected data. For example, the movement module 702 can generate the sensor output 450 as a magnitude or intensity in signal corresponding to the type of the joint sensor 448 relative to time.

As a more specific example, the movement module 702 can generate the sensor output 450 representing an occurrence or an amount of force corresponding to the force sensor 612 of FIG. 6. Also as a more specific example, the movement module 702 can generate the sensor output 450 representing an occurrence of, an intensity of, a frequency of, or a combination thereof for electromagnetic or acoustic energy corresponding to the energy sensor 614 of FIG. 6. Also as a more specific example, the movement module 702 can generate the sensor output 450 representing an occurrence of or an intensity of physical contact with the person of the user 402 at the contact sensor 618 of FIG. 6.

The movement module 702 can further determine the sensor output 450 based on communicating the sensor output 450 for further processing. The movement module 702 can communicate the sensor output 450 for generating the action command 446 of FIG. 4. The movement module 702 can communicate the sensor output 450 within a device or between units of a device, across different and separate device or groupings of devices, or a combination thereof.

For example, the movement module 702 can communicate the sensor output 450 using the first communication unit 216 of FIG. 2, the first communication interface 228 of FIG. 2, the second communication unit 236 of FIG. 2, the third communication unit 316 of FIG. 2, or a combination thereof. As a more specific example, the movement module 702 can communicate the sensor output 450 between the units or components of the first device 102 of FIG. 1 including the joint-wearable device 436. The movement module 702 can communicate the sensor output 450 within the first device 102 for further processing of the sensor output 450 using the first device 102, such as determining the joint movement 440 of FIG. 4, generating the action command 446, or a combination thereof.

Also as a more specific example, the movement module 702 can communicate the sensor output 450 between the first device 102, the second device 106 of FIG. 1, the third device 108 of FIG. 1, or a combination thereof. The movement module 702 can use the first communication unit 216, the third communication unit 316, or a combination thereof to transmit the sensor output 450. The movement module 702 can use the second communication unit 236, the third communication unit 316, or a combination thereof to receive the sensor output 450. The movement module 702 can communicate the sensor output 450 for further processing of the sensor output 450 using the second device 106, such as a server or a service provider device, using the third device 108, such as a laptop or a smart phone, or a combination thereof.

The movement module 702 can similarly determine a displacement measure 712. The displacement measure 712 is a representation of movement for the joint-wearable device 436. The displacement measure 712 can represent a displacement of the joint-wearable device 436 using a reference, a coordinate or axis system, or a combination thereof. The displacement measure 712 can further represent a displacement of the joint-wearable device 436 relative to the user 402, relative to a reference external to the user 402, or a combination thereof.

The displacement measure 712 can be based on or correspond to the overall movement 438 of FIG. 4 for the user 402. The displacement measure 712 can include an acceleration, a heading, a speed, a position or a coordinate, a change therein over time, or a combination thereof.

The movement module 702 can determine the displacement measure 712 based on information from the first location unit 220 of FIG. 2, the third location unit 320 of FIG. 3, or a combination thereof. The movement module 702 can further determine the displacement measure 712 based on communicating the displacement measure 712 between units or components of the same device, such as using interfaces therein. The movement module 702 can further determine the displacement measure 712 based on communicating the displacement measure 712, including transmitting and receiving, between separate devices using the first communication unit 216, the second communication unit 236, the third communication unit 316, or a combination thereof.

The movement module 702 can communicate various signals including an error signal 714 therein. For example, the sensor output 450, the displacement measure 712, or a combination thereof can include the error signal 714.

The error signal 714 is an undesirable or unintended influence or change in the data. The error signal 714 can include a noise, an interference, an offset level, or a combination thereof. The error signal 714 can be associated with the type of the joint sensor 448 for the sensor output 450. The error signal 714 can represent noise corresponding to the type for the joint sensor 448 corresponding to the sensor output 450. For example, the error signal 714 for the sensor output 450 of the force sensor 612 can be based on ambient input, such as ambient light, a shadow, a reflected light, an ambient sound, ambient temperature, or a combination thereof.

The movement module 702 can communicate the sensor output 450, the displacement measure 712, or a combination thereof including the error signal 714 added therein based on the environment of the joint-wearable device 436. Details regarding the processing of the error signal 714 are discussed below.

The movement module 702 can further access or control the sensor output 450, the displacement measure 712, or a combination thereof using the first control unit 212 of FIG. 2, the second control unit 234 of FIG. 2, the third control unit 312 of FIG. 3, controlling circuitry for the joint sensor 448, or a combination thereof. The movement module 702 can store the sensor output 450, the displacement measure 712, or a combination thereof in the first storage unit 214 of FIG. 2, the second storage unit 246 of FIG. 2, the third storage unit 314 of FIG. 3, or a combination thereof.

After determining the sensor output 450, the displacement measure 712, or a combination thereof, the control flow can pass from the movement module 702 to the filter module 704. The control flow can pass by having a processing result, such as the sensor output 450, the displacement measure 712, or a combination thereof, as an output from the movement module 702 to an input of the filter module 704. The control flow can further pass by storing the processing result at a location known and accessible to the filter module 704. The control flow can further pass by notifying the filter module 704, such as by using a flag, an interrupt, a status signal, or a combination thereof. The control flow can further pass using a combination of the processes described above.

The filter module 704 is configured to clarify the determined information. The filter module 704 can clarify the sensor output 450, the displacement measure 712, or a combination thereof. The filter module 704 can clarify the sensor output 450, the displacement measure 712, or a combination thereof using a signal filter 716.

The signal filter 716 is a mechanism configured to remove unwanted portions or influences within data. The signal filter 716 can include a software filter, a hardware filter, a set of passive components, a digital filter, or a combination thereof.

The filter module 704 can implement the signal filter 716 to remove the error signal 714 from the sensor output 450, the displacement measure 712, or a combination thereof. The filter module 704 can implement the signal filter 716 to remove the error signal 714 for further processing the sensor output 450, the displacement measure 712, or a combination thereof. For example, the filter module 704 can implement the signal filter 716 for determining or recognizing the joint movement 440 or the overall movement 438, for generating the action command 446, or a combination thereof.

The filter module 704 can implement the signal filter 716 in a variety of ways. For example, the filter module 704 can implement the signal filter 716 appropriate for the user 402, the joint-wearable device 436, or a combination thereof.

As a more specific example, the filter module 704 can select an instance of the signal filter 716, such as utilizing a specific circuit through manipulating relays or utilizing a specific set of filter weights, corresponding to a type of the joint sensor 448 generating the sensor output 450. The filter module 704 can select an instance of the signal filter 716 appropriate for or corresponding to the force sensor 612, the energy sensor 614, the signal generator 616 of FIG. 6, the contact sensor 618, or a combination thereof for removing the error signal 714 associated with or typical for the type of the joint sensor 448 generating the sensor output 450.

Continuing with the example, the filter module 704 can identify the joint-wearable device 436, the joint sensor 448 therein, or a combination thereof based on interacting with the joint-wearable device 436. The filter module 704 can apply or utilize the instance of the signal filter 716 corresponding to the joint-wearable device 436, the joint sensor 448 therein, or a combination thereof to the sensor output 450.

Also as a more specific example, the filter module 704 can select the instance of the signal filter 716 based on information associated with the user 402. The filter module 704 select the instance of the signal filter 716 based on information fed back from the command module 708, including contextual information relevant for the user 402 or information provided by the user 402.

Also for example, the filter module 704 can implement the signal filter 716 based on setting a sensitivity level, a granularity level, or a processing threshold. The filter module 704 can raise or lower the sensitivity level, the granularity level, the processing threshold, or a combination thereof for separating or removing the error signal 714 from the sensor output 450, the displacement measure 712, or a combination thereof. The filter module 704 can further raise or lower the sensitivity level, the granularity level, the processing threshold, or a combination thereof for determining the sensor output 450, the displacement measure 712, or a combination thereof corresponding to the joint movement 440, the overall movement 438, or a combination thereof.

The filter module 704 can implement the signal filter 716 using the first control unit 212, the second control unit 234, the third control unit 312, a circuitry or unit for the joint sensor 448, or a combination thereof. The movement module 702 can store the sensor output 450, the displacement measure 712, or a combination thereof after removing the error signal 714 in the first storage unit 214, the second storage unit 246, the third storage unit 314, or a combination thereof.

After implementing the signal filter 716, the control flow can pass from the filter module 704 to the placement module 706. The control flow can pass similarly as between the movement module 702 and the filter module 704 as described above, but using the processing result of the filter module 704, such as the sensor output 450, the displacement measure 712, or a combination thereof after removing the error signal 714.

The placement module 706 is configured to locate the joint-wearable device 436 relative to the user 402. The placement module 706 can calculate a device-placement 718 representing a location on the user 402 where the device-placement 718 is secured or affixed. The device-placement 718 can represent a placement of the joint sensor 448 on the user 402. The device-placement 718 can identify an instance of the physiological segment 410 of FIG. 4, the physiological joint 426, a location thereon, directly contacting the joint-wearable device 436, the fastening portion 608 of FIG. 4 therein, the central portion 606 of FIG. 4 therein, or a combination thereof.

The placement module 706 can calculate the device-placement 718 based on the sensor output 450. The placement module 706 can calculate the device-placement 718 in a variety of ways. For example, the placement module 706 can calculate the device-placement 718 based on the type of the joint sensor 448 or the joint-wearable device 436 generating the sensor output 450. As a more specific example, the placement module 706 can calculate the device-placement 718 based on predetermined location information corresponding to a smart watch, a bracelet interface, a necklace, an earring, or a combination thereof.

Also for example, the placement module 706 can calculate the device-placement 718 based on analyzing the displacement measure 712, the sensor output 450, or a combination thereof. The placement module 706 can include a mechanism, a method, a process, a pattern, a value, or a combination thereof for the displacement measure 712, the sensor output 450, or a combination thereof typical or characteristic of specific instances of the physiological segment 410, the physiological joint 426, a specific location thereof, or a combination thereof.

Continuing with the example, the placement module 706 can calculate the device-placement 718 based on analyzing the displacement measure 712, the sensor output 450, or a combination thereof relative to the reference side 408 of FIG. 4, the sensor location profile 622 of FIG. 6, the sensing direction 620 of FIG. 6, or a combination thereof. As a more specific example, the placement module 706 can calculate the device-placement 718 based on a height from the ground associated with the displacement measure 712, the sensor output 450, or a combination thereof.

Also as a more specific example, the placement module 706 can calculate the device-placement 718 based on the displacement measure 712, the sensor output 450, or a combination thereof characteristic of the forearm 414 of FIG. 4, the neck, the lower leg 422 of FIG. 4, or a combination thereof the in common physical activities, such as walking, sitting down or standing up, opening or closing doors, or a combination thereof. Also as a more specific example, the placement module 706 can calculate the device-placement 718 based on the displacement measure 712, the sensor output 450, or a combination thereof characteristic of a right or left, front or back, or a combination thereof of the user 402.

The placement module 706 can use the first storage interface 224 of FIG. 2, the second storage interface 248 of FIG. 2, the third storage interface 324 of FIG. 3, or a combination thereof to access the displacement measure 712, the sensor output 450, or a combination thereof. The placement module 706 can use the first control unit 212, the second control unit 234, the third control unit 312, or a combination thereof to calculate the device-placement 718. The placement module 706 can store the device-placement 718 in the first storage unit 214, the second storage unit 246, the third storage unit 314, or a combination thereof.

After calculating the device-placement 718 the control flow can pass from the placement module 706 to the command module 708. The control flow can pass similarly as between the movement module 702 and the filter module 704 as described above, but using the processing result of the placement module 706, such as the device-placement 718.

The command module 708 is configured to generate the action command 446. The command module 708 can generate the action command 446 for controlling the electronic system 100, a device therein, a function or a feature therein, or a combination thereof according to the joint movement 440 of the user 402.

The command module 708 can include a context module 722 configured to determine a user context 726 for generating the action command 446. The user context 726 can include a representation of a situation, an environment, a purpose, a significance, a factor or a value associated thereto, or a combination thereof regarding the user 402. The user context 726 can include data or information associated with or relevant to the user 402.

The user context 726 can include a label, a value, a cluster, a model, a categorization, or a combination thereof representing the purpose, the goal, the meaning, the significance, the category, the affinity, or a combination thereof associated with the user 402. The user context 726 can further include a parameter, a value, data, information, a source thereof, or a combination thereof predetermined by the electronic system 100 as being relevant to representing the condition or the situation of the user 402.

The context module 722 can determine the user context 726 based on accessing the parameter, the value, the data, the information, the source thereof, or a combination thereof. The context module 722 can further use predetermined process or method, such as including a machine learning mechanism or a pattern recognition mechanism, a preset template or threshold, or a combination thereof to identify a type, a category, a degree or magnitude, or a combination thereof as the user context 726.

The command module 708 can generate the action command 446 based on a variety of information. For example, the command module 708 can generate the action command 446 based on determining the joint movement 440, the overall movement 438, or a combination thereof.

Also for example, the command module 708 can generate the action command 446 based on the sensor output 450, the displacement measure 712, the device-placement 718, or a combination thereof. Also for example, the command module 708 can generate the action command 446 based on the user context 726, identification or type of the joint-wearable device 436 or the joint sensor 448, user interaction or confirmation, or a combination thereof.

The command module 708 can generate the action command 446 using the command pattern profile 452 of FIG. 4. The command module 708 can include the command pattern profile 452 for representing a relationship between the action command 446 and various other factors, including the sensor output 450, the displacement measure 712, the device-placement 718, the user context 726, identification or type of the joint-wearable device 436 or the joint sensor 448, user interaction or confirmation, the sensor location profile 622, or a combination thereof. The command module 708 can generate the action command 446 as a command, an instruction, an enable or initiation signal, or a combination thereof corresponding to one or more factors listed above according to the command pattern profile 452.

The command module 708 can further determine the joint movement 440, the overall movement 438, or a combination thereof using the command pattern profile 452 for representing a relationship between the joint movement 440, the overall movement 438, or a combination thereof and the sensor output 450, the displacement measure 712, or a combination thereof. The command module 708 can generate the action command 446 as a command, an instruction, an enable or initiation signal, or a combination thereof matching the joint movement 440, the overall movement 438, or a combination thereof according to the command pattern profile 452.

The command module 708 can further generate the action command 446 based on narrowing or selecting the command pattern profile 452. The command module 708 can include multiple instances of the command pattern profile 452 or multiple portions therein each specifically corresponding to one or more of the factors listed above.

For example, the command module 708 can select or narrow the command pattern profile 452 based on the user context 726 corresponding to current time, current location of the user 402, current environmental condition, active or recently started application or software file, previous instance of the action command 446, or a combination thereof. Also for example, the command module 708 can select or narrow the command pattern profile 452 based on an estimated orientation or location of the joint-wearable device 436 resulting from the overall movement 438 preceding and leading up to the current time.

The command module 708 can further interact with the user 402 to verify the action command 446, the joint movement 440, the overall movement 438, or a combination thereof. The command module 708 can receive verification information or corrections from the user. The command module 708 can use the verification information or the correction to update the command pattern profile 452. The command module 708 can generate or adjust the action command 446 based on the verification information or the correction from the user 402.

The command module 708 can send or provide the user context 726, the verification or correction from the user 402, the action command 446, or a combination thereof to the filter module 704. The filter module 704 can use the user context 726, the verification or correction from the user 402, the action command 446, or a combination thereof to implement the signal filter 716.

For example, the filter module 704 can identify the error signal 714 associated with the user context 726, the verification or correction from the user 402, the action command 446, or a combination thereof. The filter module 704 can select the circuit or calculate the filter taps appropriate for the error signal 714 corresponding to the user context 726, the verification or correction from the user 402, the action command 446, or a combination thereof.

It has been discovered that the signal filter 716 based on the user context 726 and the type for the joint sensor 448 or the joint-wearable device 436 provides increased accuracy for the action command 446. The user context 726, the type for the joint sensor 448 or the joint-wearable device 436, or a combination thereof can provide information external to the signal itself. The external information can be used to identify and eliminate the error signal 714, in addition to the overall signal used by adaptive filters.

The electronic system 100 can use the simpler and less complex devices, as exemplified above, to generate the action command 446 without utilizing image analysis and recognition. The electronic system 100 can use the simpler and less complex instances of the sensor output 450 including a binary value or a magnitude corresponding to time for generating the action command 446.

The command module 708 can use the sensor output 450 excluding images, timing, the sensor location profile 622, the device-placement 718, the user context 726, the command pattern profile 452, identification or type of the joint-wearable device 436 or the joint sensor 448, or a combination thereof to generate the action command 446 as discussed above. The command module 708 can generate the action command 446 without utilizing any images of the user 402 or any body part of the user 402, image processing or recognition, or a combination thereof.

The electronic system 100 can use the joint-wearable device 436 to generate various different commands and interpret readily known and used human gestures as commands. For example, the action command 446 of "yes" or "no" can be generated based on using the joint-wearable device 436 worn around the neck or the head of the user 402 to detect and recognize the user 402 nodding their head for "yes" or shaking their head side-to-side for "no". Also for example, the action command 446 "yes" or "no" can be generated based on using sign-language motions for "yes" and "no" detected and recognized using the joint-wearable device 436 worn about the arm, the hand 416 of FIG. 4, or a combination thereof for the user 402.

Also for example, the action command 446 associated with moving cursors or pointer, activating scroll functions, or a combination thereof can be generated using the joint-wearable device 436. The joint-wearable device 436 worn about the head or neck, the arm, the hand 416, or a combination thereof of the user 402 can be used for movements about a computer interface. The joint-wearable device 436 can detect and recognize a pointing gesture or a prolonged orientation or location of the physiological segment 410 or the physiological joint 426 as the action command 446 associated with moving cursors or pointer, activating scroll functions, or a combination thereof.

Also for example, the action command 446 associated with movement of specific fingers can be generated and implemented using the joint-wearable device 436. The joint-wearable device 436 worn about the wrist 430 of FIG. 4, the forearm 414, the hand 416, the finger 418, or a combination thereof can be used for movements of fingers. The detected finger movements can be used to distinguish between a first and an open hand for distinguishing and recognizing the action command 446.

Continuing with the example, the detected finger movements can further be used to recognize the user 402 simulating typing on a keyboard. The command module 708 can generate a number, a symbol, a letter, a probability thereof, or a combination thereof corresponding to the finger 418 and its relative location or movement. The command module 708 can further generate or adjust the number, the symbol, the probability thereof, or a combination thereof based on a sequence of the fingers or movements thereof, the user context 726, or a combination thereof to generate the action command 446 corresponding to an input from a computer keyboard.

It has been discovered that the joint-wearable device 436 implemented across multiple devices, with one device including the joint sensor 448 and another device including the command module 708 provides lower implementation cost and quicker processing. The joint sensor 448 can be placed about the user 402 using available technology for wearable devices without too much cost. The processing for generating the action command 446 can be done using smart devices commonly carried by the user 402. The updates required for the joint sensor 448 and the action command 446 are minimal, while the division of processes can optimize the performance given the size requirements and resource constraints for wearable devices.

It has further been discovered that the action command 446 based on the sensor output 450 from the joint sensor 448 provides increased privacy and less conspicuous means for interfacing with devices. The sensor output 450 from the joint sensor 448 can allow the user 402 to interface with the device using small gestures. The joint sensor 448 can eliminate an additional interfacing device or a portion thereof, such as for augmented reality and wearable device integration, while further reducing conspicuous input means, such as audible commands or displacements of the device.

It has further been discovered that the action command 446 based on determining the device-placement 718 provides increased flexibility for generating the action command 446. The determination of the device-placement 718 can allow for utilization of generic instances of the joint sensor 448 without specializing for specific joints, such as for embedding the generic sensors into clothes. Moreover, the determination of the device-placement 718 can account for unique physical characteristics of each user, without customizing to each user. The device-placement 718 can account for the physical uniqueness and allow uses of generic sensors for generating the action command 446.

It has further been discovered that the action command 446 based on the displacement measure 712 along with the sensor output 450 provides increased usability. The displacement measure 712 along with the sensor output 450 can be used to capture and utilize readily known and accepted human gestures, such as for "yes" or communicating a direction, as inputs for the electronic system 100. The displacement measure 712 along with the sensor output 450 can provide additional complexity into the commanding motion for the user 402, which can increase the number of commands available to the user 402 using gestures.

It has further been discovered that joint-wearable device 436 including the joint sensor 448 according to the sensor location profile 622 specific for determining the joint movement 440 for each specific instances of the finger 418 provides a virtual keyboard interface. The determination of the joint movement 440 for each finger can be used to identify specific letters on a keyboard interface corresponding to such finger. The electronic device 100 can use probabilities, dictionaries, or a combination thereof to identify a sequence of finger movements as a sequence of letters or numbers having meaning to the user 402 without utilizing an physical keyboard interface.

The command module 708 can use the first control unit 212, the second control unit 234, the third control unit 312, or a combination thereof to generate the action command 446. The command module 708 can further store the action command 446 in the first storage unit 214, the second storage unit 246, the third storage unit 314, or a combination thereof.

The command module 708 can use the first communication unit 216, the second communication unit 236, the third communication unit 316, the various interfaces for the units, or a combination thereof to access the above described information in generating the action command 446. The command module 708 can further use the first communication unit 216, the second communication unit 236, the third communication unit 316, the various interfaces for the units, or a combination thereof to communicate determination of the joint movement 440, the overall movement 438, or a combination thereof between devices. The command module 708 can further use the first communication unit 216, the second communication unit 236, the third communication unit 316, the various interfaces for the units, or a combination thereof to communicate the action command 446.

After generating the action command 446, the control flow can pass from the command module 708 to the command-execution module 710. The control flow can pass similarly as between the movement module 702 and the filter module 704 as described above, but using the processing result of the command module 708, such as the action command 446, an instruction or step associated with the action command 446, or a combination thereof.

The command-execution module 710 is configured to implement the action command 446. The command-execution module 710 can implement the action command 446 based on controlling the electronic system 100 according to the action command 446. The command-execution module 710 can control a device within the electronic system 100, a function or a feature within the electronic system 100, or a combination thereof. For example, the command-execution module 710 can control the first device 102, the second device 106, the third device 108, the joint-wearable device 436, a function or a feature therein, or a combination thereof.

The command-execution module 710 can communicate the action command 446 or detailed steps or instructions for implementing the action command 446 generated by the command module 708 between units within a device, across multiple devices, or a combination thereof. For example, the command-execution module 710 can communicate the action command 446 or detailed steps or instructions between units using the first control interface 222, the second control interface 244, the third control interface 322, the first storage interface 224, the second storage interface 248, the third storage interface 324, or a combination thereof. Also for example, the command-execution module 710 can communicate the action command 446 or detailed steps or instructions between devices using the first communication unit 216, the second communication unit 236, the third communication unit 316, or a combination thereof.

As a more specific example, the joint-wearable device 436 can be implemented within the first device 102. The joint-wearable device 436 can include the joint sensor 448 within the first user interface 218. The joint-wearable device 436 can use the first control unit 212, the first storage unit 214, or a combination thereof to determine the joint movement 440, generate the action command 446, or a combination thereof. The joint-wearable device 436 can further use the first control unit 212 to control the first device 102 and implement the action command 446 therein.

Continuing with the example, the joint-wearable device 436 can use the command-execution module 710 to implement the action command 446 generated by the first device 102 within the second device 106, the third device 108, or a combination thereof. The joint-wearable device 436 can use the first communication unit 216, the second communication unit 236, the third communication unit 316, or a combination thereof to communicate the action command 446 or detailed steps or instructions corresponding thereto between devices. The command-execution module 710 can use the second control unit 234, the third control unit 312, or a combination thereof to control second device 106, the third device 108, or a combination thereof and implement the action command 446 therein.

Also a more specific example, the joint-wearable device 436 can be implemented across multiple devices. The joint-wearable device 436 can include the joint sensor 448 within the first user interface 218 of the first device 102. The joint-wearable device 436 can further use the communication unit 216, the second communication unit 236, the third communication unit 316, or a combination thereof to communicate the sensor output 450 between the first device 102 and the second device 106, the third device 108, or a combination thereof.

Continuing with the example, the joint-wearable device 436 can use the second device 106, the third device 108, one or more units therein, or a combination thereof to determine the joint movement 440, generate the action command 446, or a combination thereof. The action command 446 or the detailed steps or instructions corresponding thereto can be communicated between and implemented in the first device 102, the second device 106, the third device 108, or a combination thereof.

The physical transformation from the action command 446 based on the sensor output 450 results in the movement in the physical world, such as physical change in information communicated for the user 402 on one or more of the devices or physical displacement of the user 402 or the joint-wearable device 436. Movement in the physical world results in updates to the user context 726, the sensor output 450, the overall movement 438, or a combination thereof, which can be fed back into the computing system 100 and generate further instances of the action command 446.

Figure 8:
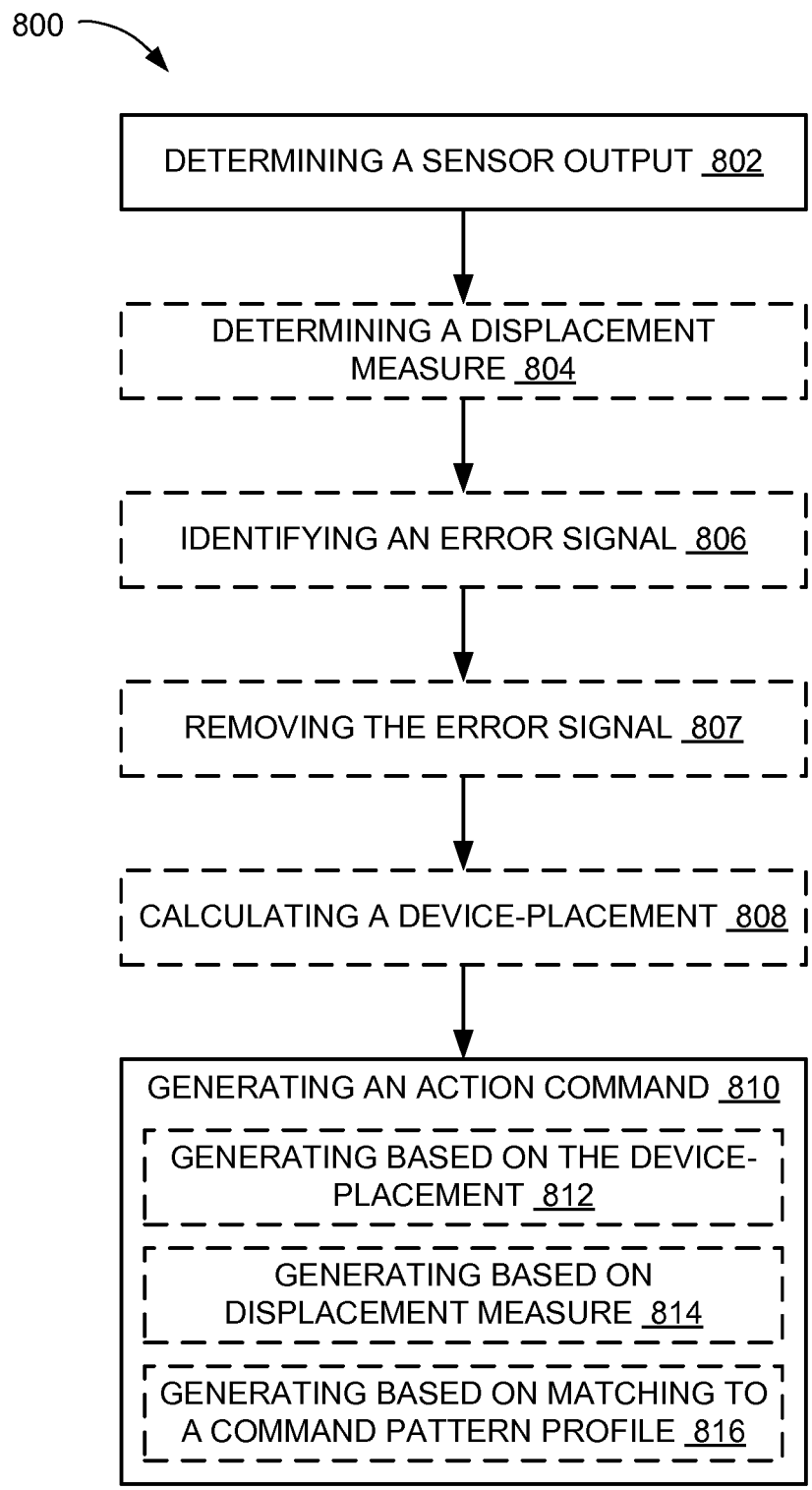
FIG. 8 is a flow chart of a method of operation of the electronic system of FIG. 1 in a further embodiment of the present invention.

Referring now to FIG. 8, therein is shown an exemplary flow chart of a method 800 of operation of an electronic system 100 of FIG. 1 in a further embodiment. In one example embodiment, the electronic system 100 can implement the control flow 700 of FIG. 7.

The exemplary flow chart 800 can include determining a sensor output for representing a joint movement of a physiological joint of a user detected by a joint sensor in a box 802. The exemplary flow chart 800 can further include determining a displacement measure for representing an overall movement corresponding to the joint sensor in a block 804. The electronic system 100 can use the movement module 702 of FIG. 7 to determine the sensor output 450 of FIG. 4, the displacement measure 712 of FIG. 7, or a combination thereof corresponding to the block 802 and the block 804. The movement module 702 of FIG. 7 can determine the sensor output 450 of FIG. 4, the displacement measure 712 of FIG. 7, or a combination thereof as described above.

The exemplary flow chart 800 can further include identifying an error signal for representing noise corresponding to a type for the joint sensor in a block 806. The exemplary flow chart 800 can further include removing the error signal based on the joint sensor in generating the action command in a block 807. The electronic system 100 can use the filter module 704 of FIG. 7 to identify and remove the error signal 714 of FIG. 7 corresponding to the block 806 and the block 807. The filter module 704 can identify and remove the error signal 714 as described above.

The exemplary flow chart 800 can further include calculating a device-placement based on the sensor output for representing a placement of the joint sensor on the user in a block 808. The electronic system 100 can use the placement module 706 of FIG. 7 to calculate the device-placement 718 of FIG. 7 corresponding to the block 808. The placement module 706 can calculate the device-placement 718 as described above.

The exemplary flow chart 800 can further include generating with a control unit an action command based on the sensor output for controlling the electronic system 100 according to the joint movement of the user in a block 810. The electronic system 100 can use the command module 708 of FIG. 7 to generate the action command 446 of FIG. 4 corresponding to the block 810. The placement module 706 can generate the action command 446 as described above.

The exemplary flow chart 800 can further include generating the action command based on the device-placement in a block 812. The electronic system 100 can use the command module 708 to generate the action command 446 based on the device-placement 718 as described above.

The exemplary flow chart 800 can further include generating the action command based on the displacement measure along with the sensor output in a block 814. The electronic system 100 can use the command module 708 to generate the action command 446 based on the displacement measure 712 along with the sensor output 450 as described above.

The exemplary flow chart 800 can further include generating the action command based on matching the sensor output to a command pattern profile for representing a relationship between the action command, the joint movement, the sensor output, or a combination thereof in a block 816. The electronic system 100 can use the command module 708 to generate the action command 446 using the command pattern profile 452 of FIG. 4 as described above.

The modules described herein can be hardware implementation or hardware accelerators, including passive circuitry, active circuitry, or both, in the first control unit 212 of FIG. 2, the second control unit 234 of FIG. 2, the third control unit 312 of FIG. 3, the joint-wearable device 436 of FIG. 4, the joint sensor 448 of FIG. 4, or a combination thereof. The modules can also be hardware implementation or hardware accelerators, including passive circuitry, active circuitry, or both, within the first device 102, the second device 106, the third device 108, the joint-wearable device 436, or a combination thereof but outside of the first control unit 212, the second control unit 234, the third control unit 312, the joint sensor 448, or a combination thereof.

The computing system 100 has been described with module functions or order as an example. The computing system 100 can partition the modules differently or order the modules differently. For example, the user context module 722 of FIG. 7 can be an independent module separate from and coupled to the command module 708. Also for example, the user context module 722 can further be implemented in parallel with the command module 708, the movement module 702 or a combination thereof. Also for example, the command-execution module 710 of FIG. 7 can be combined with the command module 708.

For illustrative purposes, the various modules have been described as being specific to the first device 102, the second device 106, the third device 108, the joint-wearable device 436, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 214 of FIG. 2, the second storage unit 246 of FIG. 2, the third storage unit 314 of FIG. 3, or a combination thereof can represent the non-transitory computer readable medium. The first storage unit 214, the second storage unit 246, the third storage unit 314, or a combination thereof, or a portion therein can be removable from the first device 102, the second device 106, the third device 108, the joint-wearable device 436, or a combination thereof. Examples of the non-transitory computer readable medium can be a non-volatile memory card or stick, an external hard disk drive, a tape cassette, or an optical disk.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
    a fastening portion of a joint-wearable device, the fastening portion configured to physically secure the joint-wearable device for affixing the joint-wearable device relative to a physiological joint of a user;
    a multiple instances of a joint sensor of the joint-wearable device, the joint sensor connected to the fastening portion and configured to generate a sensor output for representing a joint movement associated with the physiological joint in controlling the electronic system according to the joint movement; and
    wherein the multiple instances of the joint sensor including:
        a first-direction sensor configured to detect a direction of the joint movement; and
        a first opposing sensor configured to detect an opposite direction of the joint movement from the direction of the joint movement detected by the first-direction sensor along a same plane.

2. The system as claimed in claim 1 further comprising a communication unit of the joint-wearable device, coupled to the joint sensor, configured to communicate the sensor output for generating an action command using a further device.

3. The system as claimed in claim 1 further comprising a control unit of the joint-wearable device, coupled to the joint sensor, configured to generate an action command based on the sensor output, the action command for controlling the electronic system according to the joint movement.

4. The system as claimed in claim 1 wherein:
    the fastening portion is configured to physically secure the joint-wearable device for affixing a first instance of the joint sensor on a reference side associated with the physiological joint; and
further comprising:
    a further instance of the joint sensor of the joint-wearable device, the further instance of the joint sensor connected to the fastening portion for affixing the further instance of the joint sensor opposite the reference side.

5. The system as claimed in claim 1 wherein:
    the fastening portion is configured to physically secure the joint-wearable device for affixing the joint sensor in association with a positive direction for the physiological joint; and
further comprising:
    a further-direction sensor of the joint-wearable device, the further-direction sensor connected to the fastening portion for affixing the further-direction sensor in association with a further direction forming an angle with the positive direction.

6. The system as claimed in claim 1 wherein:
    the fastening portion is configured to physically secure the joint-wearable device for affixing the joint-wearable device relative to the physiological joint connecting a first physiological segment and a second physiological segment; and
    the joint sensor is configured to generate the sensor output for generating an action command corresponding to the joint movement to control the electronic system.

7. The system as claimed in claim 1 further comprising:
    a central portion of the joint-wearable device connected to the fastening portion; and
wherein:
    the joint sensor is directly connected to or embedded in the central portion, the fastening portion, or a combination thereof.

8. The system as claimed in claim 1 wherein the fastening portion is configured to secure the joint sensor for affixing the joint sensor overlapping the physiological joint, attached to a first physiological segment adjacent to the physiological joint and oriented with a sensing direction of the joint sensor extending across the physiological joint toward a second physiological segment, or a combination thereof.

9. The system as claimed in claim 1 wherein the joint sensor includes a force sensor, an energy sensor, a contact sensor, or a combination thereof.

10. The system as claimed in claim 1 further comprising:
    a signal generator connected to the fastening portion and configured to emit an energy for detection by the joint sensor;
wherein:
    the joint sensor is configured to generate the sensor output based on detecting the energy from the signal generator in relation to the physiological joint, a first physiological segment, a second physiological segment, or a combination thereof.

* * * * *